(12) United States Patent
Alcazar et al.

(10) Patent No.: US 6,618,990 B2
(45) Date of Patent: *Sep. 16, 2003

(54) THERMOPLASTIC FLOWER POT WITH A THIN SKIRT

(75) Inventors: Antonio V. Alcazar, Rowland Heights, CA (US); Donald E. Weder, Highland, IL (US)

(73) Assignee: Southpac Trust International, Inc.

( * ) Notice: Subject to any disclaimer, the term of this patent is extended or adjusted under 35 U.S.C. 154(b) by 0 days.

This patent is subject to a terminal disclaimer.

(21) Appl. No.: 10/247,257

(22) Filed: Sep. 16, 2002

(65) Prior Publication Data

US 2003/0019155 A1 Jan. 30, 2003

Related U.S. Application Data

(63) Continuation of application No. 09/969,053, filed on Oct. 2, 2001, now Pat. No. 6,474,020, which is a continuation of application No. 09/732,375, filed on Dec. 7, 2000, now Pat. No. 6,324,786, which is a continuation of application No. 09/559,449, filed on Apr. 27, 2000, now Pat. No. 6,240,675, which is a continuation of application No. 08/787,182, filed on Jan. 21, 1997, now abandoned, which is a continuation of application No. 08/482,351, filed on Jun. 7, 1995, now Pat. No. 5,706,605.

(51) Int. Cl.[7] .................................... A01G 9/02
(52) U.S. Cl. ........................................... 47/72
(58) Field of Search ................. 47/41.01, 65.5, 47/65.7, 66, 72; 220/669, 679

(56) References Cited

U.S. PATENT DOCUMENTS

| | | | |
|---|---|---|---|
| 5,120 | A | 7/1871 | Snow |
| D279,279 | S | 6/1885 | Wagner |
| D298,904 | S | 12/1888 | Mourich et al. |
| 797,175 | A | 8/1915 | Collenburg |

(List continued on next page.)

FOREIGN PATENT DOCUMENTS

| | | |
|---|---|---|
| CH | 560532 | 4/1975 |
| DE | 2102789 | 3/1972 |
| FR | 2489126 | 5/1982 |

(List continued on next page.)

OTHER PUBLICATIONS

Brochure—Speed Cover®, The Simple Solution for Those Peak Volume Periods, Highland Supply Corporation, 1989.
Brochure—Speed Sheets™ and Speed Rolls, Highland Supply Corporation—1990.
Brochure—Speed Cover® Especially Designed for Hanging Baskets, Highland Supply Corporation, 1989.
Brochure—Speed Sheets™ and Speed Rolls, Highland Supply Corporation—1990.
Brochure—Easter Basket Kit, Highland Manufacturing & Sales Co., undated.
Brochure—Floral & Nursery Products, IVEX Partners in Performance, undated.

(List continued on next page.)

*Primary Examiner*—Charles T. Jordan
*Assistant Examiner*—Elizabeth Shaw
(74) *Attorney, Agent, or Firm*—Dunlap, Codding & Rogers, P.C.

(57) ABSTRACT

A flower pot cover constructed of a material for providing a decorative cover for an item, such as a floral grouping. The flower pot cover comprises a base portion and a skirt portion. The base portion has an upper end, a lower end, a bottom having a first thickness and a continuous sidewall extending generally between the upper and lower ends of the base portion. The skirt portion is positioned circumferentially about the upper end of the base portion and extends a distance therefrom. The skirt portion is substantially flexible and has a third thickness which is less than the first thickness of the bottom of the base portion. The base portion and the skirt portion cooperate to provide the flower pot cover with a shape sustaining configuration.

34 Claims, 11 Drawing Sheets

U.S. PATENT DOCUMENTS

| | | |
|---|---|---|
| 1,212,428 A | 1/1917 | Watson |
| 1,520,647 A | 12/1924 | Hennegan |
| 1,892,818 A | 1/1931 | Trew |
| 1,794,212 A | 2/1931 | Snyder |
| 1,868,853 A | 7/1932 | Sievers |
| 2,355,559 A | 8/1944 | Renner |
| 2,540,707 A | 2/1951 | Beukelman |
| 2,774,187 A | 12/1956 | Smithers |
| 2,785,508 A | 3/1957 | Coleman, Jr. |
| 2,845,735 A | 8/1958 | Werner |
| 3,021,046 A | 2/1962 | Pullen |
| 3,022,605 A | 2/1962 | Reynolds |
| 3,058,263 A | 10/1962 | Reynolds |
| 3,362,105 A | 1/1968 | Steiger |
| 3,488,022 A | 1/1970 | Vittori |
| 3,748,781 A | 7/1973 | Erling |
| 3,767,104 A | 10/1973 | Bachman et al. |
| 3,852,913 A | 12/1974 | Clendinning et al. |
| 3,919,163 A | 11/1975 | Clendinning et al. |
| 3,921,333 A | 11/1975 | Clendinning et al. |
| 3,923,729 A | 12/1975 | Clendinning et al. |
| 3,962,503 A | 6/1976 | Crawford |
| 3,973,316 A | 8/1976 | Maher |
| 4,043,077 A | 8/1977 | Stonehocker |
| 4,104,845 A | 8/1978 | Hoffmann |
| 4,170,618 A | 10/1979 | Adams |
| 4,173,108 A | 11/1979 | Eglinton et al. |
| 4,216,620 A | 8/1980 | Weder et al. |
| 4,300,312 A | 11/1981 | Weder et al. |
| 4,333,267 A | 6/1982 | Witte |
| 4,413,725 A | 11/1983 | Bruno et al. |
| 4,739,581 A | 4/1988 | Jarvis |
| 4,795,601 A | 1/1989 | Cheng |
| 5,038,933 A | 8/1991 | Weder |
| 5,073,161 A | 12/1991 | Weder et al. |
| 5,094,060 A | 3/1992 | Caird |
| 5,161,348 A | 11/1992 | Weder |
| 5,228,234 A | 7/1993 | de Klerk et al. |
| 5,239,775 A | 8/1993 | Landau |
| 5,345,745 A | 9/1994 | Weder |
| 5,363,592 A | 11/1994 | Weder et al. |
| 5,396,992 A | 3/1995 | Weder |
| 5,443,670 A | 8/1995 | Landau |
| D447,086 S * | 8/2001 | Weder ................ D11/164 |
| D457,099 S * | 5/2002 | Lai ................... D11/152 |

FOREIGN PATENT DOCUMENTS

| | | |
|---|---|---|
| FR | 2489128 | 5/1982 |
| GB | 5874 | 5/1886 |
| GB | 6874 | 5/1886 |
| GB | 5408 | 3/1903 |
| GB | 1204647 | 9/1970 |

OTHER PUBLICATIONS

Brochure—Redi–Wrap™ Floral & Nursery Products, IVEX Partners in Performance, Undated.
Brochure—Holiday Colors, A Special Holiday, A Special Pot Cover, IVEX Partners in Performance, undated.
Brochure—Redi–Wrap™ Floral & Nursery Products, The Instant Pot Wrap!, IVEX Partners in Performance, undated.
Brochure—Packaging for Profits, IVEX Partners in Performance, undated.
Speed Cover Brochure, "The Simple Solution for Those Peak Volume Periods", Highland Supply Corporation, 1989.
Speed Sheets and Speed Rolls Brochure, Highland Supply Corporation, 1990.

* cited by examiner

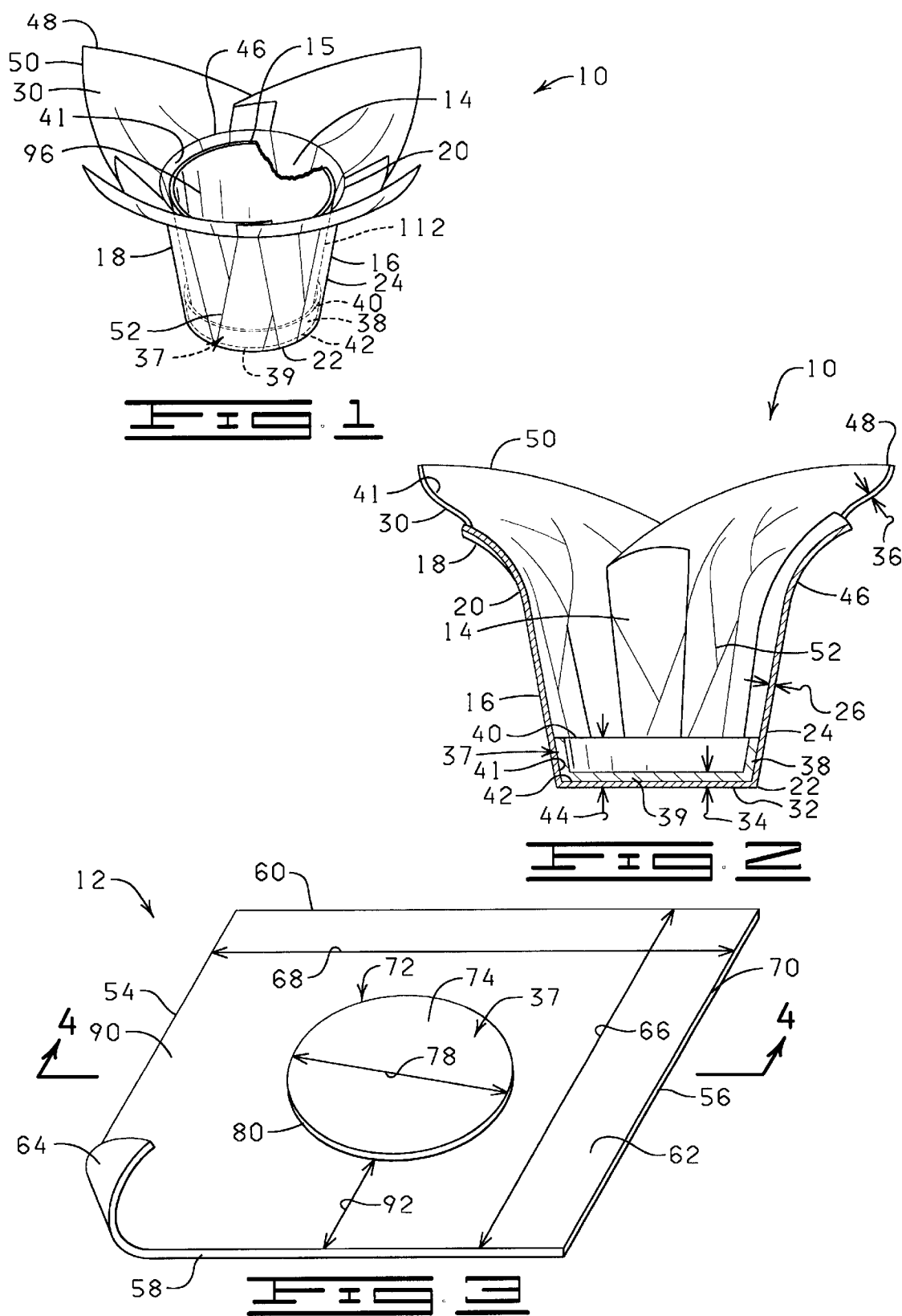

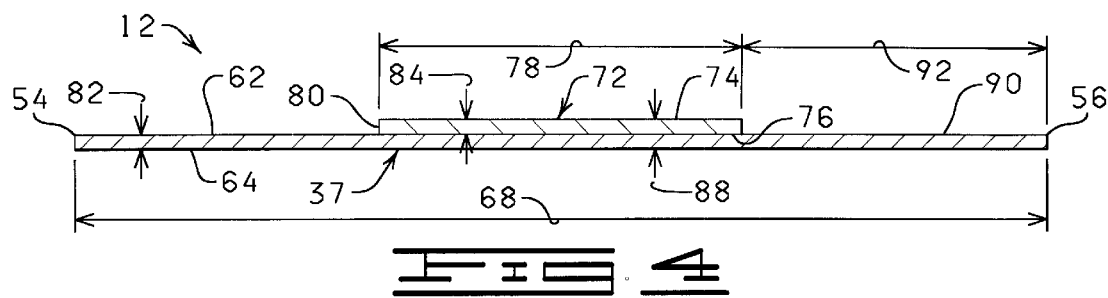
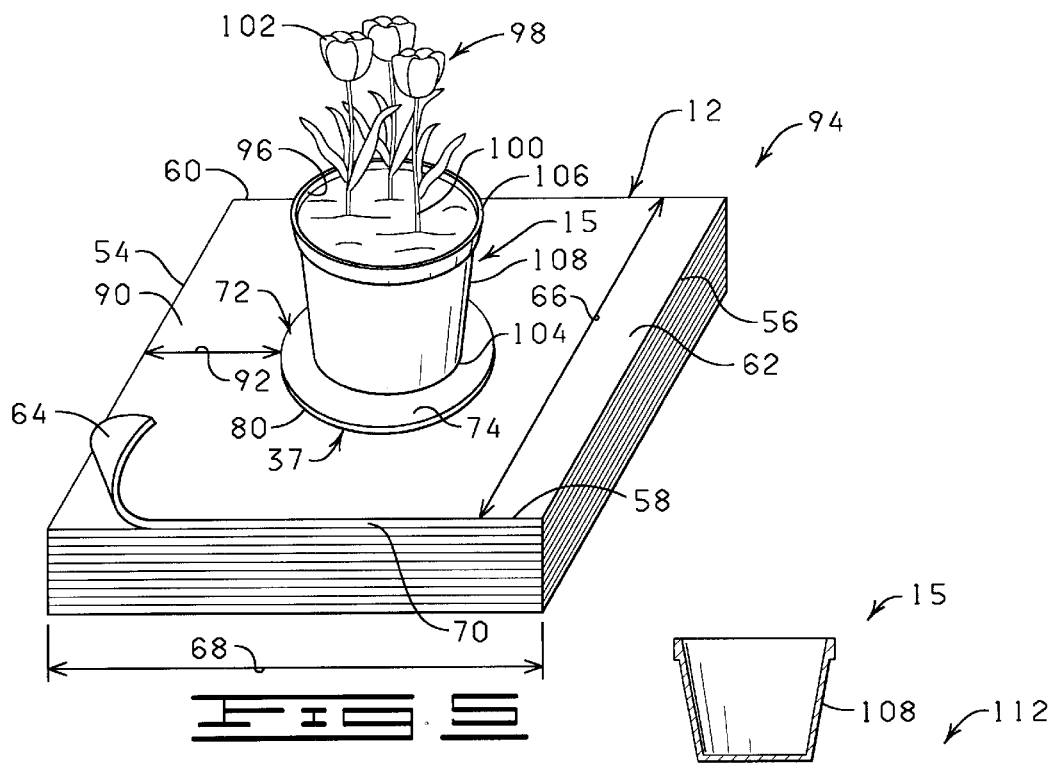
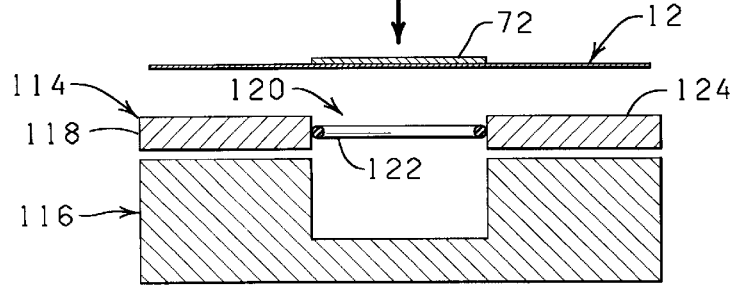

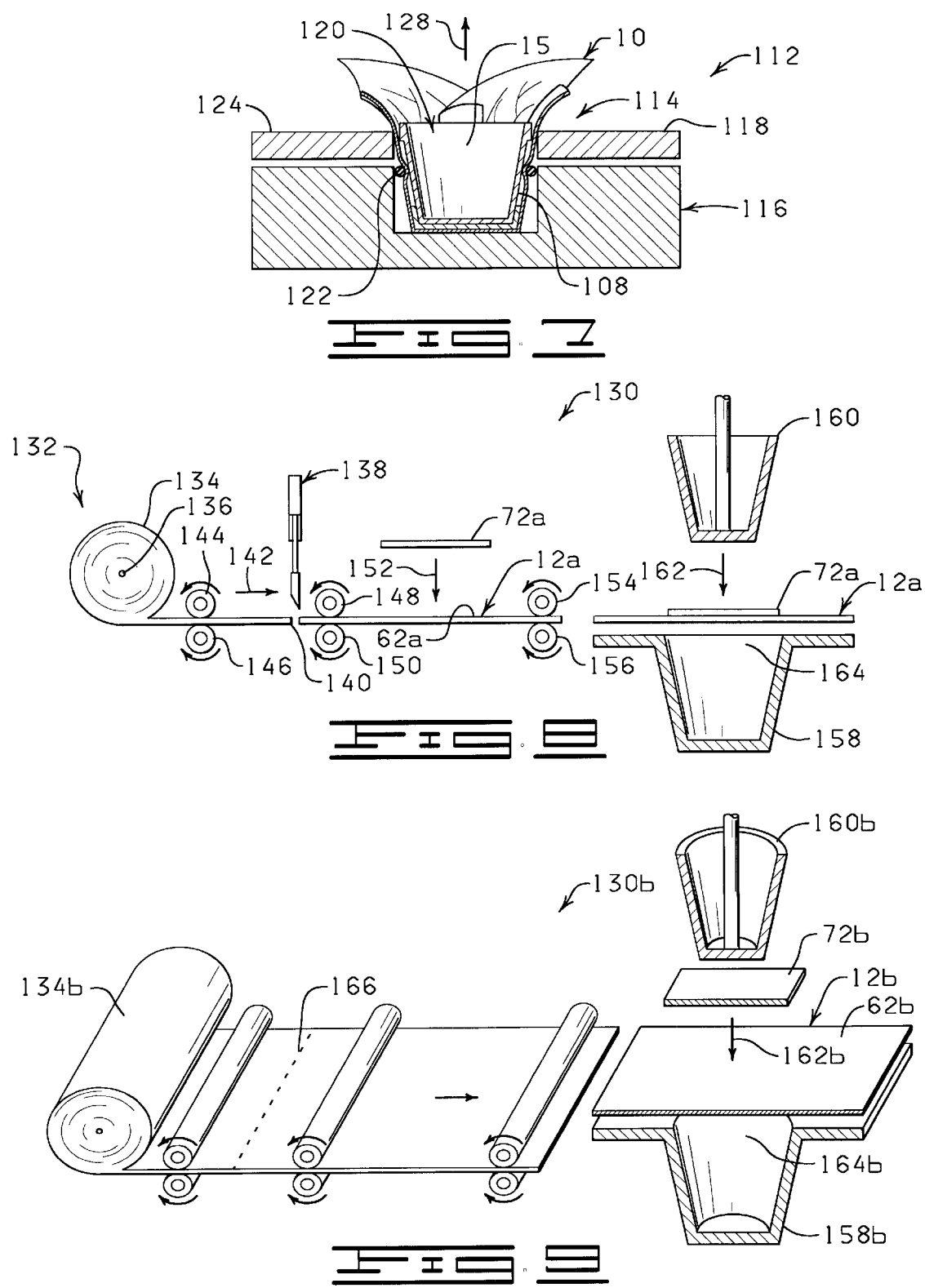

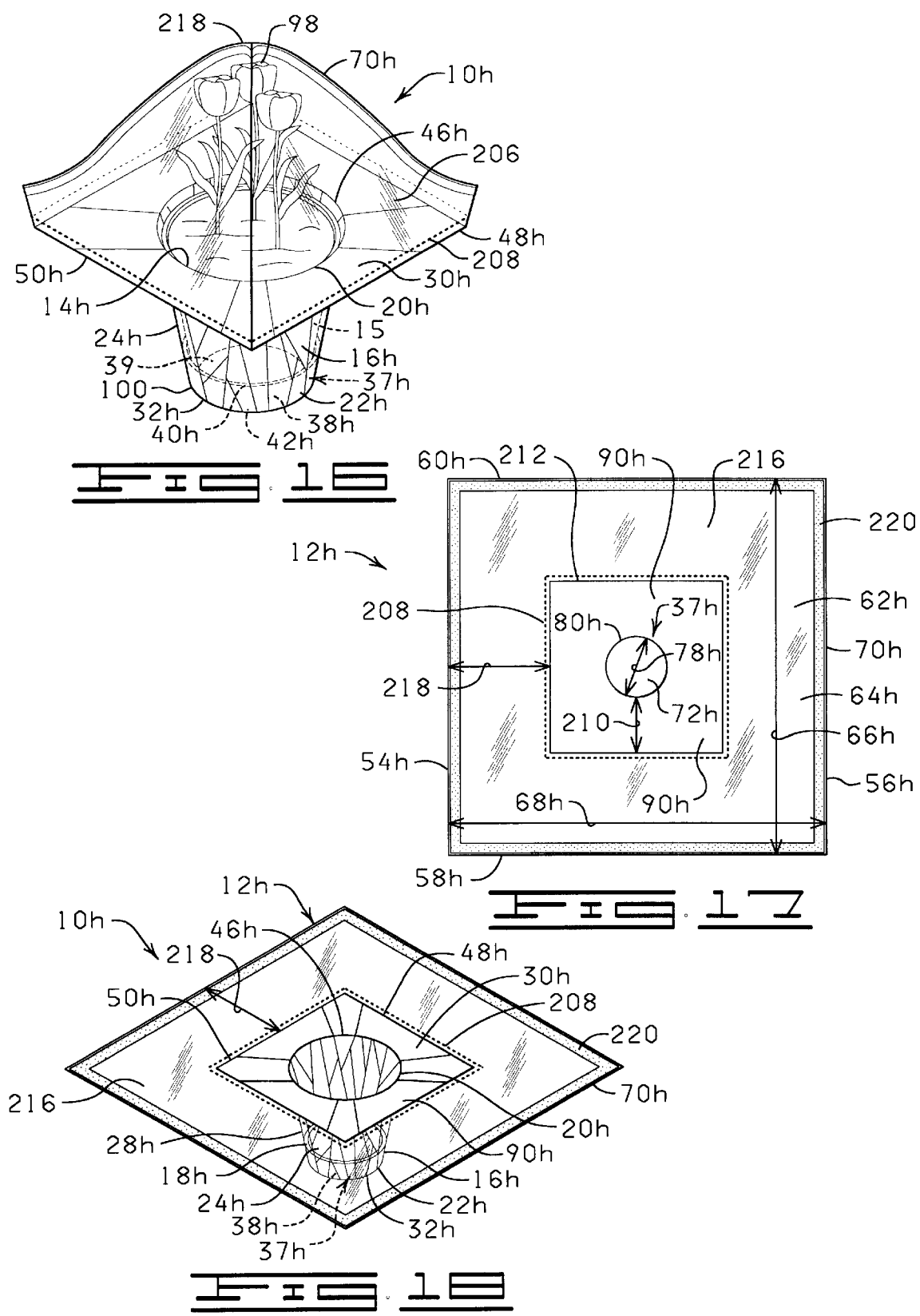

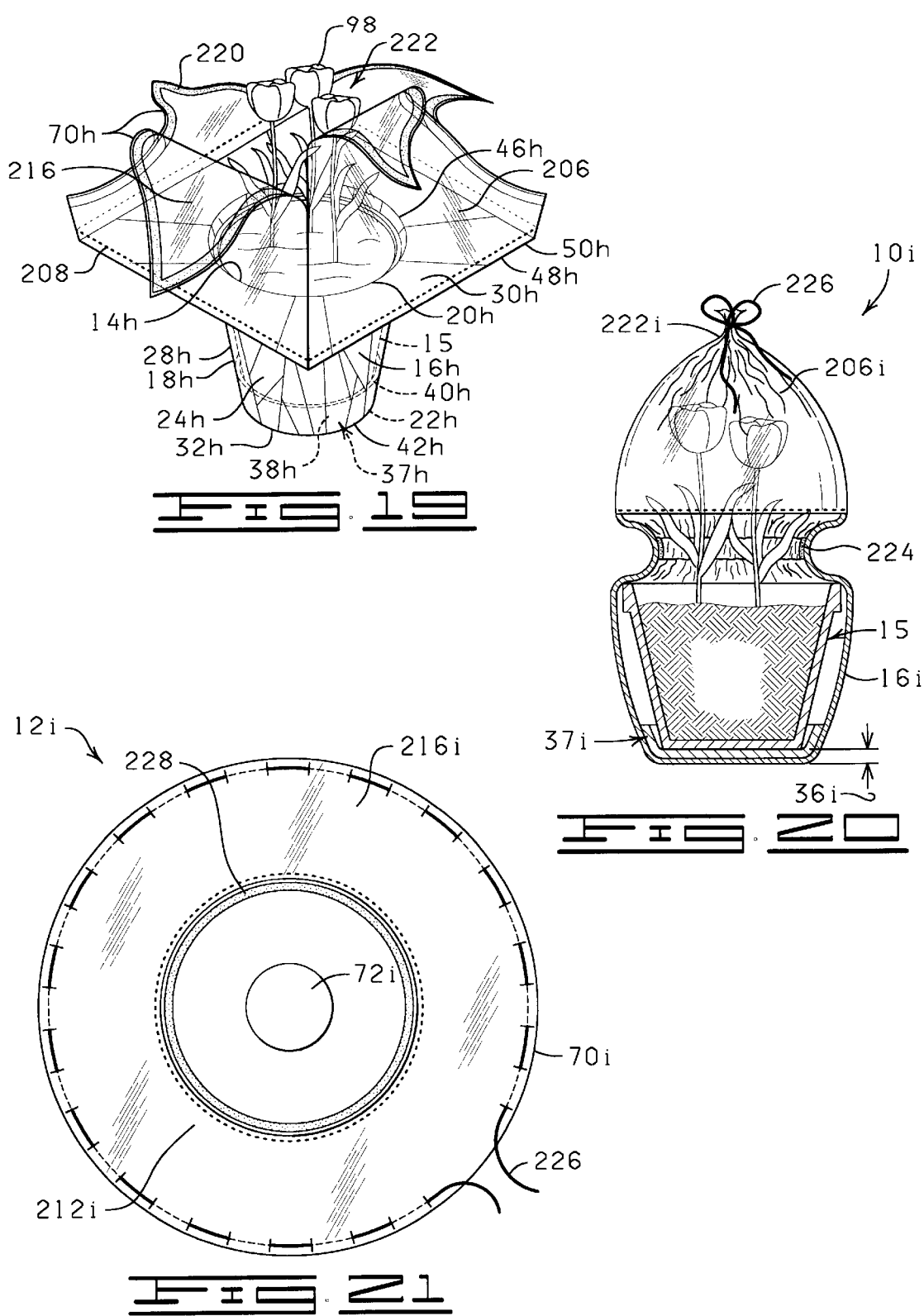

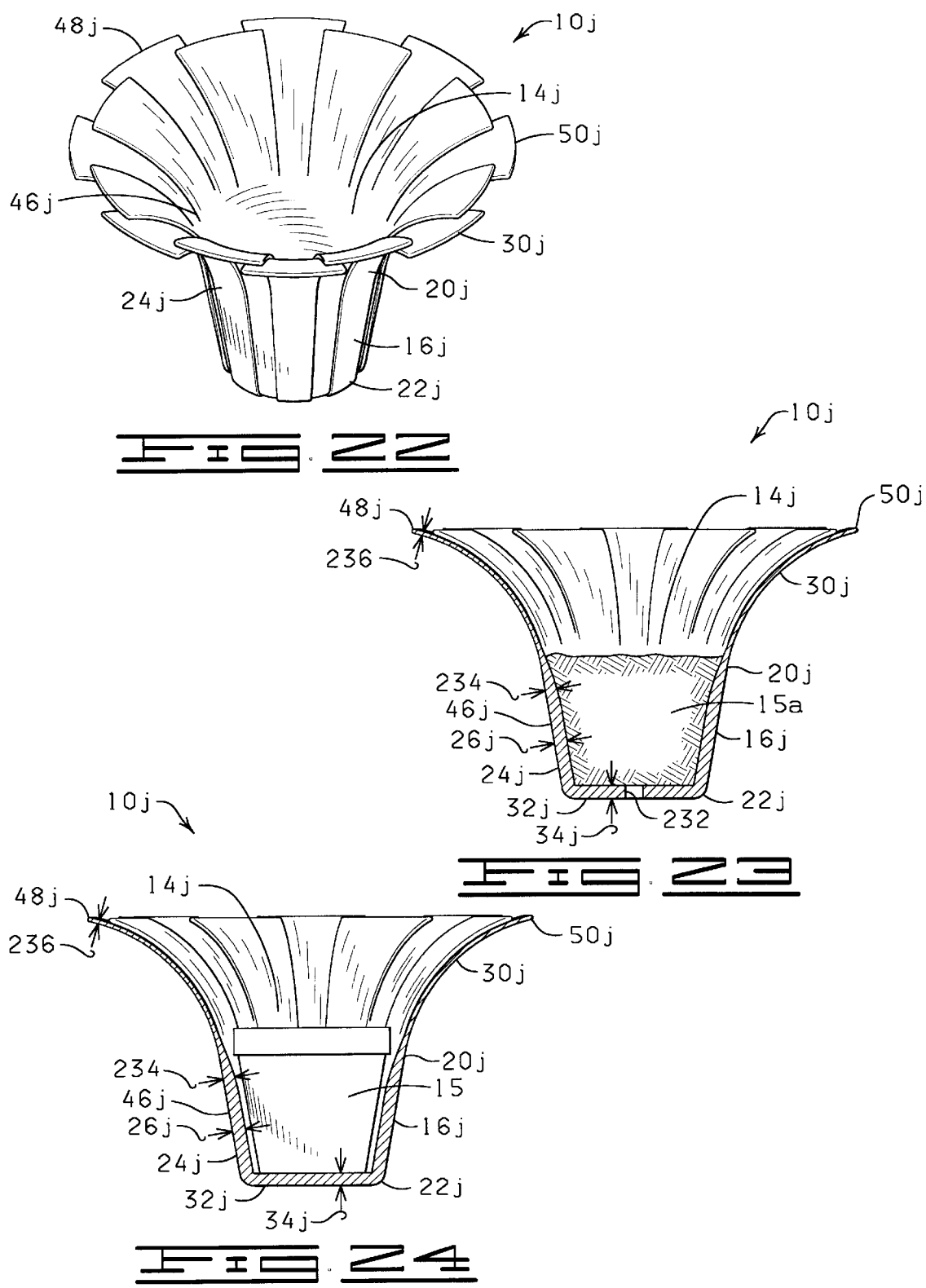

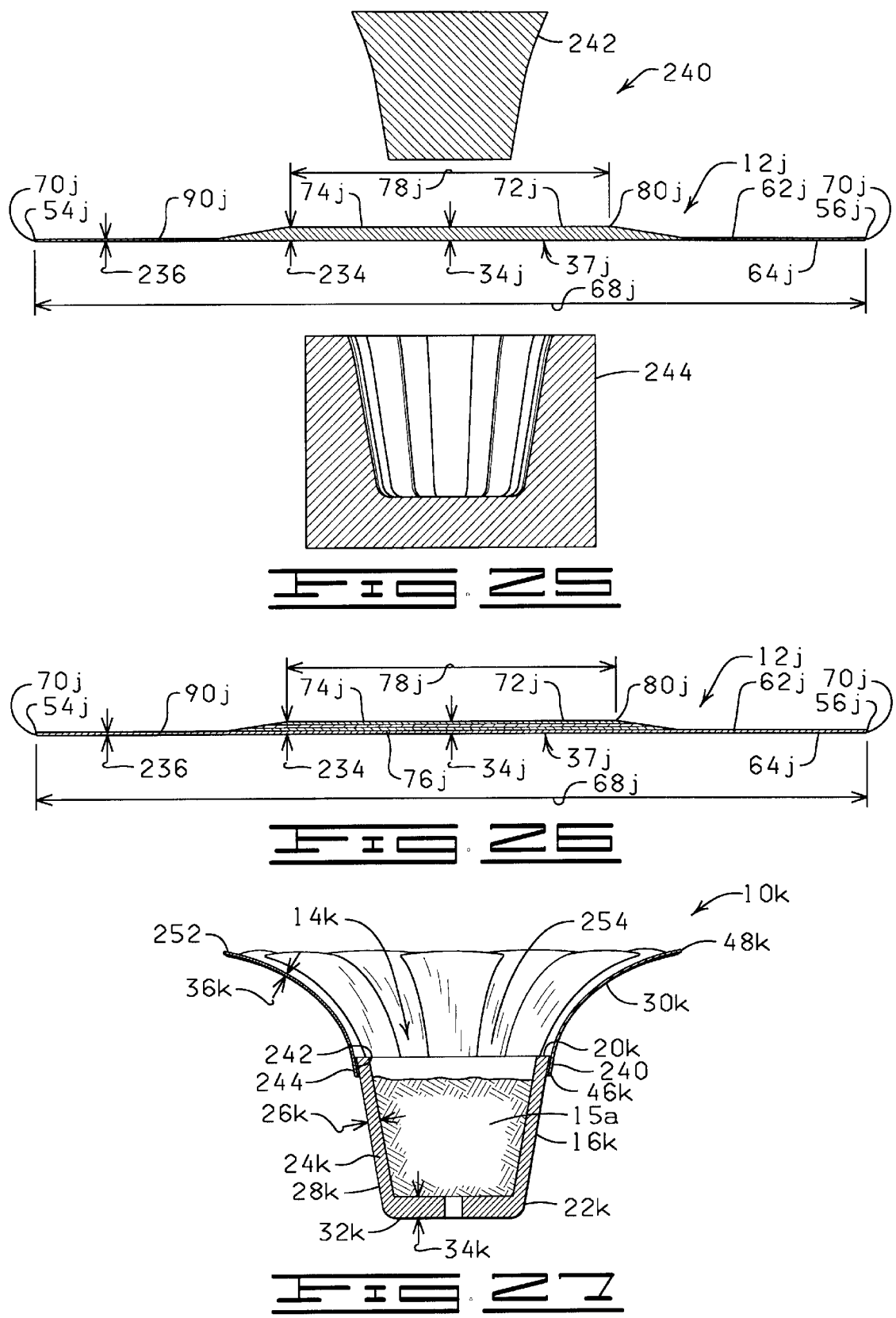

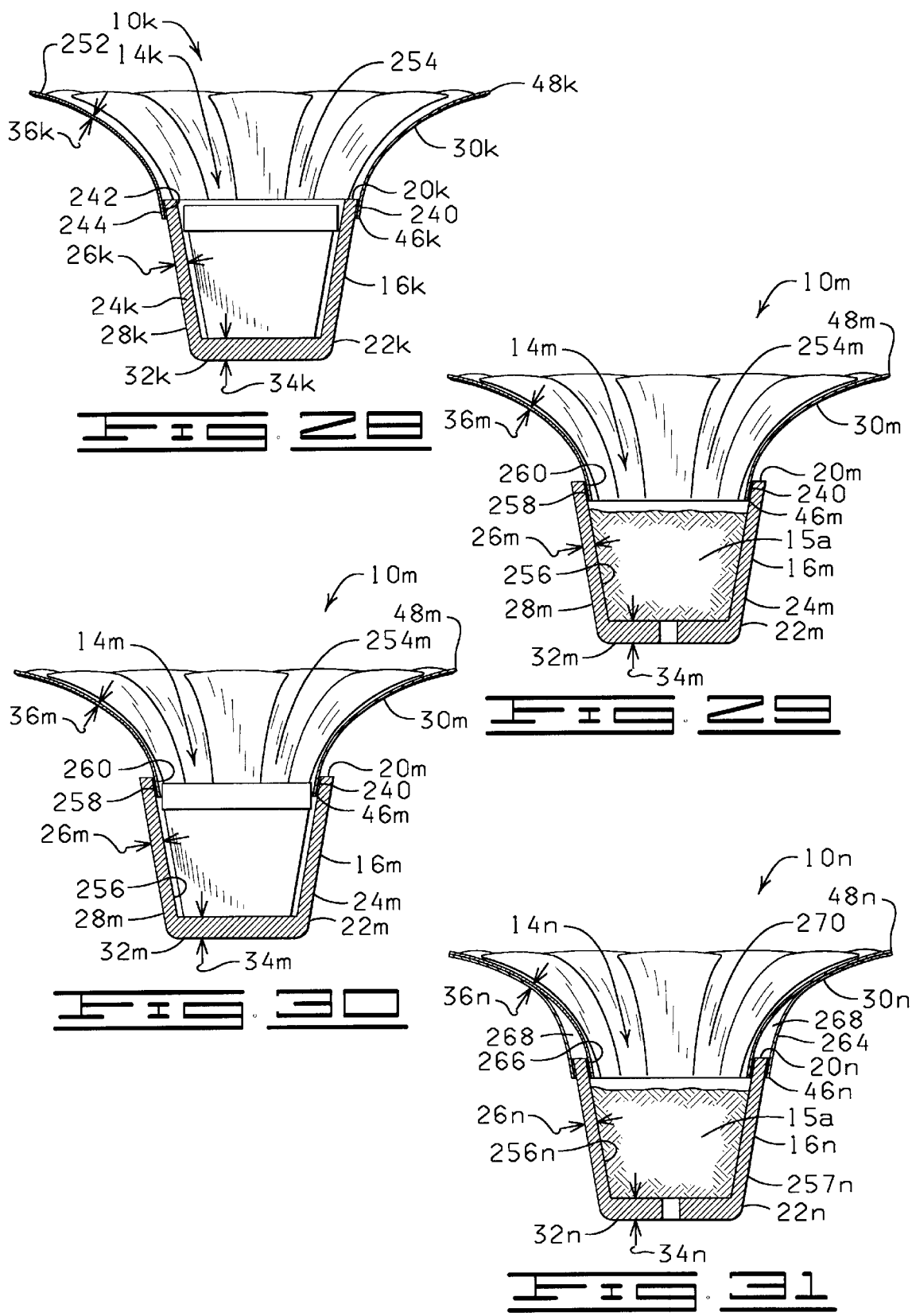

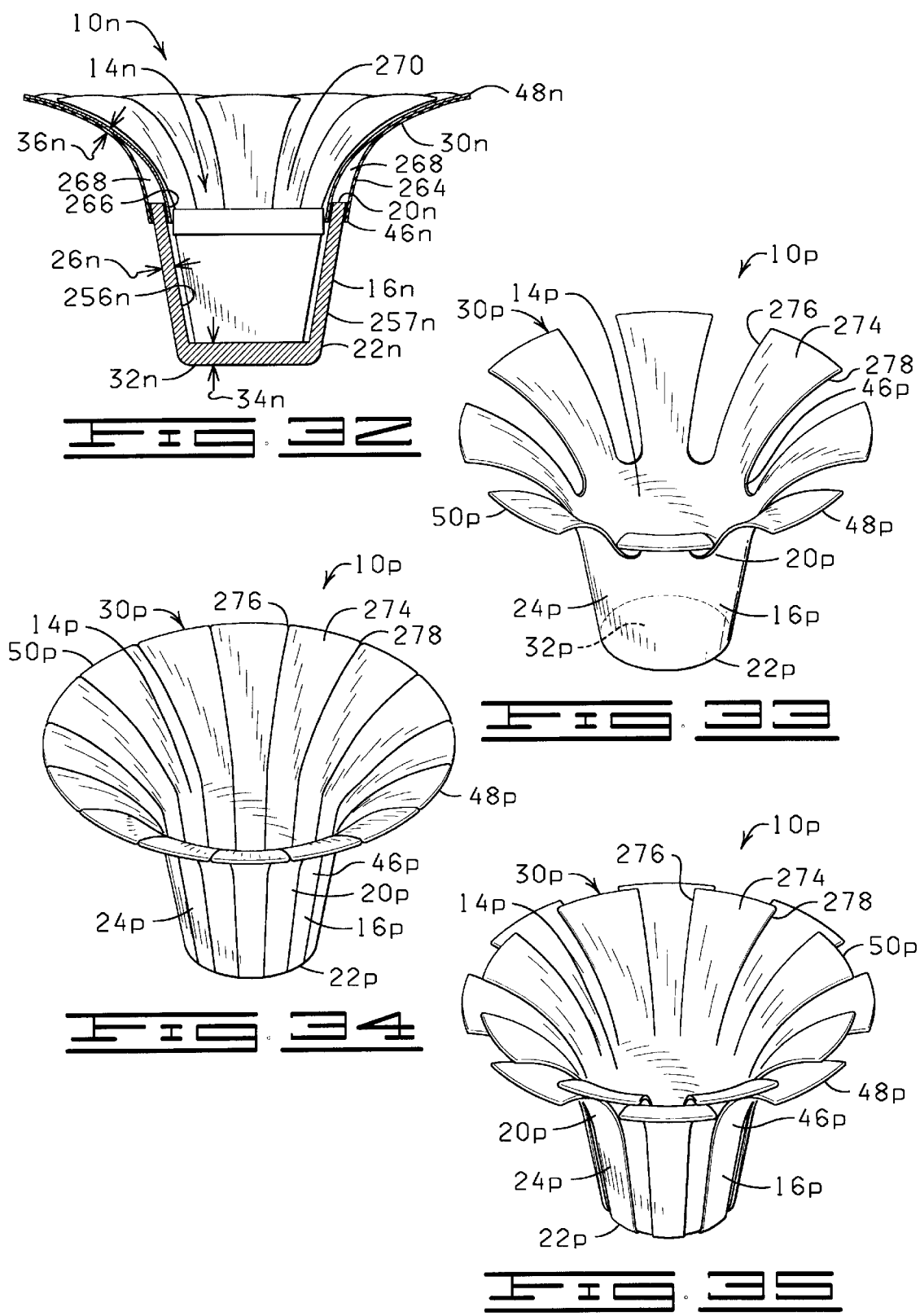

THERMOPLASTIC FLOWER POT WITH A THIN SKIRT

CROSS REFERENCE TO RELATED APPLICATIONS

This is a continuation of U.S. Ser. No. 09/969,053, entitled THERMOPLASTIC FLOWER POT WITH A THIN SKIRT, filed on Oct. 2, 2001 now U.S. Pat. No. 6,474,020, the entire content of which is hereby incorporated herein by reference; which is a continuation of U.S. Ser. No. 09/732,375, entitled THERMOPLASTIC FLOWER POT WITH A THIN SKIRT, filed Dec. 7, 2000, now U.S. Pat. No. 6,324,786; which is a continuation of U.S. Ser. No. 09/559,449, entitled THERMOPLASTIC FLOWER POT WITH A THIN SKIRT, filed Apr. 27, 2000 now U.S. Pat. No. 6,240,675, the entire content of which is hereby incorporated herein by reference, which is a continuation of U.S. Ser. No. 08/787,182, entitled THERMOPLASTIC FLOWER POT WITH A THIN SKIRT, filed Jan. 21, 1997 now abandoned, the entire content of which is hereby expressly incorporated herein by reference, which is a continuation of U.S. Ser. No. 08/482,351, filed Jun. 7, 1995 now U.S. Pat. No. 5,706,605, entitled THERMOPLASTIC FLOWER POT WITH A THIN SKIRT.

FIELD OF THE INVENTION

The present invention relates to flower pot covers and more particularly, but not by way of limitation, to flower pot covers having a bottom and an upwardly extending sidewall wherein the sidewall has a thickness less than the thickness of the bottom.

DESCRIPTION OF RELATED ART

Flower pot covers have traditionally been disposed about the outer surfaces of flower pots to decorate the flower pot and to minimize the amount of water or potting medium which may spill from the flower pot. The materials typically used to form decorative flower pot covers are relatively thin. While such thin materials are attractive in that they provide the flower pot covers with a skirt having a loose, billowy appearance, such materials are susceptible to puncturing or tearing by sharp areas or edges on or near the bottom and sides of the flower pot which allows moisture to leak through the flower pot cover, possibly causing damage to carpet, furniture, tile, and other surfaces upon which the flower pot cover may be disposed.

However, if rigid or semi-rigid materials are used to produce flower pot covers and make the flower pot covers less susceptible to puncturing or tearing, then the skirt of the flower pot cover loses its loose, billowy appearance. Thus, it would be of benefit to the floral industry and to the end purchaser to have a flower pot cover constructed of rigid or semi-rigid material, but which has a skirt having a loose, billowy appearance.

BRIEF DESCRIPTION OF THE DRAWINGS

FIG. 1 is a perspective view of a flower pot cover constructed in accordance with the present invention having a flower pot disposed therein.

FIG. 2 is a cross sectional view of the flower pot cover of FIG. 1 wherein the flower pot has been removed.

FIG. 3 is a perspective view of a sheet of material having a basal layer disposed thereon for forming into the flower pot cover of FIG. 1.

FIG. 4 is a cross sectional view of the sheet of material of FIG. 3 taken along lines 4—4.

FIG. 5 is a perspective view of a plurality of the sheets of material of FIG. 3 wherein the sheets of material are stacked one on top of the other so as to form a pad of sheets of material, the top sheet of material of the pad having a flower pot disposed on the basal layer.

FIG. 6 is a cross sectional view of a flower pot cover former and band applicator apparatus having the sheet of material of FIG. 3 disposed above an opening formed therein and having a flower pot disposed above the sheet of material.

FIG. 7 is a cross sectional view of the flower pot cover former and band applicator apparatus of FIG. 6 having the flower pot and the sheet of material disposed in the opening therein.

FIG. 8 is a diagrammatic view, partially in cross section, illustrating the positioning of a basal layer on a sheet of material before the sheet of material is positioned in a flower pot cover forming position of a flower pot cover forming apparatus.

FIG. 9 is a perspective diagrammatic view, partially in cross section, illustrating a basal layer being disposed onto a sheet of material when the sheet of material is positioned in a flower pot cover forming position of a flower pot cover forming apparatus.

FIG. 16 is a perspective view of a flower pot cover constructed in accordance with the present invention having a sheet extension portion extending about a floral grouping and closed with an adhesive so as to form an upper sleeve portion.

FIG. 17 is a plan view of a sheet of material constructed in accordance with the present invention for forming into the flower pot cover of FIG. 16.

FIG. 18 is a perspective view of the flower pot cover of FIG. 16 formed from the sheet of material of FIG. 17 prior to forming the upper sleeve portion from the sheet extension portion.

FIG. 19 is a perspective view of the flower pot cover shown in FIG. 18 having a floral grouping disposed therein and having the upper sleeve portion partially formed about the floral grouping.

FIG. 20 is a side elevational view, partially in cross section, of a flower pot cover having an upper sleeve portion extending about a floral grouping with the upper sleeve portion closed via a drawstring.

FIG. 21 is a plan view of a sheet of material constructed in accordance with the present invention having a sheet extension portion connected thereto and a drawstring extending circumferentially near the outer peripheral edge of the sheet extension portion.

FIG. 22 is a perspective view of an integrally formed flower pot cover having a skirt portion constructed in accordance with the present invention.

FIG. 23 is a cross sectional view of the flower pot cover of FIG. 22 having a growing medium disposed therein and illustrating a base portion thereof tapering into a skirt portion.

FIG. 24 is a cross sectional view of the flower pot cover of FIG. 22 having a flower pot disposed therein.

FIG. 25 is a diagrammatic, cross sectional view of a sheet of material positioned between a male and female mold for forming the sheet of material into the flower pot cover of FIG. 22 in accordance with the present invention.

FIG. 26 is a cross sectional view of a sheet of material for forming into the flower pot cover of FIG. 22 in accordance with the present invention.

FIG. 27 is a cross sectional view of another embodiment of a flower pot cover constructed in accordance with the present invention having a growing medium disposed therein.

FIG. 28 is a cross sectional view of the flower pot cover of FIG. 27 having a flower pot disposed therein.

FIG. 29 is a cross sectional view of another embodiment of a flower pot cover constructed in accordance with the present invention having a growing medium disposed therein.

FIG. 30 is a cross sectional view of the flower pot cover of FIG. 29 having a flower pot disposed therein.

FIG. 31 is a cross sectional view of another embodiment of a flower pot cover constructed in accordance with the present invention having a growing medium disposed therein.

FIG. 32 is a cross sectional view of the flower pot cover of FIG. 31 having a flower pot disposed therein.

FIG. 33 is a perspective view of another embodiment of a flower pot cover constructed in accordance with the present invention having a plurality of spatially disposed skirt segments.

FIG. 34 is a perspective view of another embodiment of a flower pot cover constructed in accordance with the present invention having a plurality of abuttingly disposed skirt segments.

FIG. 35 is a perspective view of another embodiment of a flower pot cover constructed in accordance with the present invention having a plurality of overlappingly disposed skirt segments.

DESCRIPTION OF THE PREFERRED EMBODIMENTS

Definitions

Figure 10:
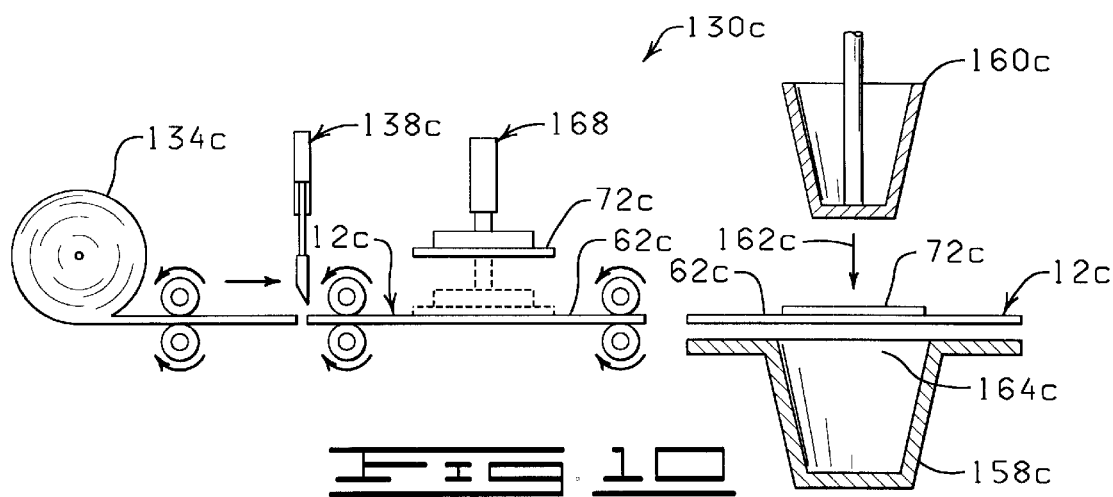
FIG. 10 is a diagrammatic view, partially in cross section, illustrating a basal layer being disposed automatically onto a sheet of material.

"Flower pot cover" as used herein refers to a decorative covering for floral groupings, flower pots, soil or the like and combinations thereof.

"Flower pot" or "pot", as used herein, refers to containers used for holding floral groupings or potted plants. Examples of such flower pots are clay pots, plastic pots and the like.

The flower pot defines a receiving space adapted to receive floral groupings. The floral grouping may be disposed within the receiving space of the flower pot along with a suitable growing medium, a floral foam or combinations thereof. It will also be understood that in some cases the floral grouping, and any appropriate growing medium or other retaining medium, may be disposed in a flower pot cover without the flower pot if the flower pot cover is adapted to contain the growing medium.

"Floral grouping" as used herein means cut fresh flowers, artificial flowers, a single flower, other fresh and/or artificial plants or other floral materials and may include other secondary plants and/or ornamentation or artificial or natural materials which add to the aesthetics of the overall floral arrangement. The floral grouping may comprise a bloom or foliage portion and a stem portion. However, it will be appreciated that the floral grouping may consist of only a single bloom or only foliage (not shown). The term "floral grouping" may be used interchangeably herein with the term "floral arrangement".

"Polymer film", as used herein, refers to a man-made polymer such as a polypropylene or a naturally occurring polymer such as cellophane. A polymer film is relatively strong and will not tear as easily as paper or foil.

"Spot" or "spots" as used herein refers to any geometric shape of spot including, but not limited to, what is commonly referred to as strips.

"Bonding material" as used herein refers to any type of material or thing which can be used to effect the bonding or connecting of two adjacent portions of material or sheets of material to effect the connection or bonding described herein. "Bonding material" may also refer to ties, labels, bands, ribbons, strings, tapes, staples, heat sealants or combinations thereof.

Further, "bonding material" may also refer to an adhesive, preferably a pressure sensitive adhesive, or a cohesive. Where the bonding material is a cohesive, a similar cohesive material must be disposed on an adjacent surface for bonding contact between the two surfaces. "Bonding material" may also refer to materials which are sonic sealable and vibratory sealable. The term "bonding material" may also refer to a heat sealing lacquer which may be applied to the sheet of material and, in this instance, heat, sound waves, or vibrations, also must be applied to effect the sealing. Furthermore, the term "bonding material" may also refer to any heat or chemically shrinkable material, any electrical means, magnetic means, mechanical or barb-type fastening means or clamps, curl-type characteristics of the film or materials incorporated in the sheet of material which can cause the material to take on certain shapes, and any type of welding method which may weld portions of the sheet of material to itself or to the flower pot, or to both the sheet itself and the flower pot.

"Band" when used herein refers to any material which may be secured about an object such as a flower pot, such bands commonly being referred to as elastic bands, rubber bands or non-elastic bands and may also refer to any other type of material such as an elastic or non-elastic string or elastic piece of material, non-elastic piece of material, a round piece of material, a flat piece of material, a ribbon, a piece of paper strip, a piece of plastic strip, a piece of wire, a tie wrap or a twist tie or combinations thereof or any other device capable of gathering the sheet of material to removably or substantially permanently form a crimped portion and secure the crimped portion formed in the sheet of material which may be secured about an object such as the flower pot. "Band" may also refer to a bow if desired in a particular application.

Description of FIGS. 1–5

Shown in FIG. 1 is a flower pot cover 10 constructed in accordance with the present invention. The flower pot cover 10 is formed from a sheet of material 12 (FIGS. 3–5) shaped to define a receiving space 14 adapted to receive an object, such as a flower pot 15.

The flower pot cover 10 has a base or lower portion 16 having an outer peripheral surface 18. The base portion 16 has an upper end 20, a lower end 22 and a continuous sidewall 24 which defines the outer peripheral surface 18 of the base portion 16. The sidewall 24 of the base portion 16 of the flower pot cover 10 has a thickness 26 (FIG. 2). A skirt or upper portion 30 of the flower pot cover 10 is positioned circumferentially about the upper end 20 of the base portion 16 of the flower pot cover 10 and extends generally outwardly and upwardly therefrom substantially as shown. The base portion 16 of the flower pot cover 10 is further provided with a bottom 32 (FIG. 2) having a thickness 34 (FIG. 2) which is greater than the thickness 26 of the sidewall 24 of the base portion 16 and a thickness 36 (FIG. 2) of the skirt portion 30.

The flower pot cover 10 further includes a basal portion 37 having a basal rim portion 38 and a basal base or bottom portion 39. The basal base portion 39 is disposed substantially adjacent the bottom 32 of the base portion 16 of the flower pot cover 10 and the basal rim portion 38 of the basal portion 37 extends circumferentially about an interior surface 41 of the lower end 22 of the base portion 16 of the flower pot cover 10. The basal rim portion 38 has an upper end 40, a lower end 42 and a height 44 extending generally between the upper and lower ends 40 and 42, respectively, of the basal rim portion 38.

The skirt portion 30 of the flower pot cover 10 has a first end 46, a second end 48 and an outer peripheral edge 50. The thickness 36 of the skirt portion 30 of the flower pot cover 10 substantially corresponds to the thickness 26 of the sidewall 24 of the base portion 16 of the flower pot cover 10.

The flower pot cover 10 may be further provided with a plurality of overlapping folds, only one of which is designated by the reference numeral 52. The overlapping folds 52 extend at various distances and at various angles over the outer peripheral surface 18 of the flower pot cover 10. The overlapping folds 52 may be connected, at least partially connected, or substantially free standing folds independent of adjacent folds. When it is desired that the overlapping folds 52 be either partially connected or connected, the connection of the overlapping folds 52 may be accomplished by using a heat sealable material and heat sealing the overlapping folds 52. Alternatively, the overlapping folds 52 may be adhesively or cohesively connected. When connected, the overlapping folds 52 cooperate to provide the flower pot cover 10 with enhanced mechanical reinforcement and thereby provide the flower pot cover 10 with a shape sustaining configuration.

The overlapping folds 52 and the manner in which the overlapping folds 52 provide the flower pot cover 10 with the enhanced mechanical reinforcement are explained in more detail in copending application U.S. Ser. No. 08/347,611, entitled "Flower Pot Assembly Formed From A Sheet With An Opening", filed Nov. 30, 1994, and which is expressly incorporated herein by reference.

The sheet of material 12 utilized in the construction of the flower pot cover 10 desirably has sufficient memory so that the flower pot cover 10 formed from the sheet of material 12 may be flattened (not shown) for shipping and storage purposes and subsequently unflattened for use. That is, the sheet of material 12 used in the formation of the flower pot cover 10 desirably posses sufficient memory so that the flower pot cover 10 formed from the sheet of material 12 can be easily unflattened to assume the preformed shape of the flower pot cover 10 without any substantial loss of the preformed shape and without having to be remolded thereby providing a flexible, yet shape sustaining flower pot cover 10.

Shown in FIG. 3 is the sheet of material 12 utilized in the formation of the flower pot cover 10. The sheet of material 12 has a first end 54, a second end 56, a first side 58, a second side 60, an upper surface 62 and a lower surface 64. The sheet of material 12 has a length 66 extending between the first and the second sides 58 and 60, respectively, of the sheet of material 12; and a width 68 extending generally between the first and the second ends 54 and 56, respectively, of the sheet of material 12. The first end 54, the second end 56, the first side 58 and the second side 60 cooperate to provide the sheet of material 12 with an outer peripheral edge 70.

The sheet of material 12 may be constructed of a single sheet of material or a plurality of sheets of the same or different types of materials. The sheets of material may be separate sheets or the sheets may be connected together or laminated together.

Although the sheet of material 12 is shown in FIG. 3 as being generally square shaped, it is to be understood that the sheet of material 12 may assume any geometric, non-geometric or asymmetrical shape. For example, the sheet of material 12 may be square, rectangular, circular, heart-shaped or the like. The shape of the sheet of material 12 will depend on the configuration of the flower pot cover 10 to be formed from the sheet of material 12.

The sheet of material 12 is further provided with a basal layer 72 for forming the basal portion 37 of the flower pot cover 10. The basal layer 72 is disposed on a portion of the sheet of material 12 to be formed into the bottom 32 of the base portion 16 of the flower pot cover 10. The basal layer 72 may be a separate sheet of material which is affixed to the sheet of material 12 during or after the fabrication of the sheet of material 12 and/or the basal layer 72 may be integrally formed with the sheet of material 12 (FIG. 25).

Referring now to FIG. 3 in combination with FIG. 4, the basal layer 72 has an upper surface 74 and may be provided with a lower surface 76 (FIG. 4) when the basal layer 72 is formed from a separate sheet of material. The lower surface 76, when present, is positioned adjacent the upper surface 62 of the sheet of material 12, and the basal layer 72 may be affixed to the sheet of material 12 via any suitable bonding material.

The basal layer 72, as shown in FIG. 3 is generally disc shaped and has a diameter 78 and a periphery 80. However, it is to be noted that the basal layer 72 may assume any geometric, non-geometric or asymmetrical shape such as a square, a rectangle or an oval.

The basal layer 72, which functions to enhance the strength, rigidity and the resistance to tearing, puncturing, abrading and leaking of the bottom 32 and lower end 22 of the base portion 16 of the flower pot cover 10 formed from the sheet of material 12, may be constructed of a single layer of material (FIG. 3) or a plurality of layers of the same or different types of materials (FIG. 26), or the basal layer 72 may comprise an effective amount of a material applied to the sheet of material 12. Examples of such materials which may be applied to the sheet of material 12 to form the basal layer 72 are foams, inks, lacquers, polymers or the like and combinations thereof.

The sheet of material 12 has a thickness 82 (FIG. 4) that can vary widely and any thickness of the sheet of material 12 may be utilized in accordance with the present invention as long as the sheet of material 12 can be formed into the flower pot cover 10 as described herein. Typically, the thickness 82 of the sheet of material 12 will be in a range from about 0.1 mils to about 30 mils, desirably in a range from about 0.1 mils to about 10 mils and more desirably in a range from about 0.4 to about 2 mils.

The basal layer 72 has a thickness 84 that can vary widely and any thickness of the basal layer 72 can be utilized in accordance with the present invention as long as the sheet of material 12 having the basal layer 72 disposed thereon can be formed into the flower pot cover 10, as described herein. Typically, the thickness 84 of the basal layer 72 is in a range from about 0.1 mils to about 500 mils, desirably in a range from about 0.3 mil to about 100 mils and more desirably in a range from about 0.3 mil to 30 mils. The basal layer 72 is generally flexible, but may be relatively rigid as compared to the sheet of material 12.

The above stated shapes, thicknesses and construction of the sheet of material 12 and the basal layer 72 will apply to all of the embodiments of the sheet of material 12 and the basal layer 72 which are discussed herein.

The basal layer 72, and the portion of the sheet of material 12 either immediately below the basal layer 72, or integral thereto, cooperate to define the basal portion 37 of the flower pot cover 10 having a thickness 88. That is, the thickness 82 of the sheet of material 12 and the thickness 84 of the basal layer 72 cooperate to define the thickness 88 of the basal portion 37 of the flower pot cover 10.

The sheet of material 12 has a peripheral portion 90 surrounding the basal layer 72 and extending a distance 92 from the periphery 80 of the basal layer 72 to the outer peripheral edge 70 of the sheet of material 12. The peripheral portion 90 of the sheet of material 12 has a thickness which is equal to the thickness 82 of the sheet of material 12 and which is less than the thickness 88 of the basal portion 37 of the flower pot cover 10.

In a preferred embodiment, the sheet of material 12 and the basal layer 72 are constructed from one or more sheets of polypropylene film (a 20"×15" sheet of Mobil 270 ABW white opaque film laminated to a 20"×15" sheet of Mobil 220 AB clear film) having a thickness in a range of from less than about 0.5 mil to about 1 mil. The layers of material comprising the sheet of material 12 may be connected together or laminated or may be separate layers.

The sheet of material 12 and the basal layer 72 may be constructed from any suitable material that is capable of being formed into the flower pot cover 10. For example, the sheet of material 12 or the basal layer 72 may be constructed out of paper (untreated or treated in any manner), cellophane, foil, polymer film, fabric (woven, nonwoven, synthetic, natural and combinations thereof) and combinations thereof.

The sheet of material 12 and/or the basal layer 72 may vary in color. Further, the sheet of material 12 and/or basal layer 72 may consist of designs or decorative patterns which are printed, etched, and/or embossed thereon using inks or other printing materials. An example of an ink which may be applied to the sheet of material 12 and/or the basal layer 72 is described in U.S. Pat. No. 5,147,706 entitled "Water Based Ink On Foil And/Or Synthetic Organic Polymer" issued to Kingman on Sep. 15, 1992.

In addition, the sheet of material 12 and/or the basal layer 72 may have various colorings, coatings, flocking and/or metallic finishes, or other decorative surface ornamentation applied separately or simultaneously thereon. Alternatively, the sheet of material 12 and/or the basal layer 72 may be characterized totally or partially by pearlescent, translucent, transparent, iridescent or the like qualities. Each of the above-named characteristics may occur alone or in combination and each surface of the sheet of material 12 and/or the basal layer 72 may vary in the combination of such characteristics.

As shown in FIG. 5, a plurality of sheets of material 12 are stacked one on top of the other to form a pad 94. The plurality of sheets of material 12 are positioned so that the first sides 58, the second sides 60, the first ends 54 and the second ends 56 of the sheets of material 12 in the pad 94 are generally aligned. With the exception of the first or top sheet of material 12, the upper surface 62 of each sheet of material 12 is disposed generally adjacent the lower surface 64 of an adjacent sheet of material 12 in the pad 94.

The flower pot 15 is disposed upon the upper surface 74 of the basal layer 72 of the sheet of material 12 disposed generally on the top of the pad 96. The flower pot 15 is shaped to define a receiving space 96 for receiving an object, such as a floral grouping 98. The floral grouping 98 has a stem portion 100 which is disposed within the receiving space 96 of the flower pot 15 and a bloom portion 102 which extends generally upwardly therefrom. The flower pot 15 has a closed bottom end 104, an open upper end 106 and a continuous sidewall 108 extending generally between the bottom end 104 and the upper end 106 thereof.

One method for forming the sheet of material 12 having the basal layer 72 (FIG. 5) into the flower pot cover 10 is to dispose the bottom end 104 of the flower pot 15 onto the basal layer 72 substantially as shown in FIG. 5. Thereafter, the peripheral portion 90 of the sheet of material 12 is lifted and pressed about the sidewall 108 of the flower pot 15 causing a portion of the upper surface 62 of the sheet of material 12 to engage the sidewall 108 of the flower pot 15. The lower surface 64 of the sheet of material 12 thereby forms the outer peripheral surface 18 of the flower pot cover 10, the upper surface 62 of the sheet of material 12 thereby forms the interior surface 41 of the flower pot cover 10, the basal portion 86 thereby forms the bottom 32 of the flower pot cover 10 and the outer peripheral edge 70 of the sheet of material 12 thereby forms the outer peripheral edge 50 of the skirt portion 30 of the flower pot cover 10.

The sheet of material 12 can also be formed into the flower pot cover 10 employing the method disclosed in U.S. Pat. No. 4,733,521 entitled "Cover Forming Apparatus" issued to Weder et al., on Mar. 29, 1988, which is expressly incorporated herein by reference. Alternatively, the sheet of material 12 may be formed into the flower pot cover 10 by positioning the sheet of material 12 between a female die and a male die as disclosed in U.S. Pat. No. 4,773,182 entitled "Article Forming System" issued to Weder et al., on Sep. 27, 1988, which is also hereby incorporated herein by reference.

The bottom end 104 of the flower pot 15 desirably has a circumference less than the circumference of the basal layer 72 so that when the sheet of material 12 having the basal layer 72 thereon is formed about the flower pot 15, an excess portion of the basal layer 72 extends about the bottom end 104 of the sidewall 108 of the flower pot 15 and cooperates with the sheet of material 12 to form the basal rim portion 38 of the basal portion 37 of the flower pot cover 10. It should be understood that the height 44 of the basal rim portion 38 of the basal portion 37 of the flower pot cover 10 can vary and such will be dependent upon the circumference of the bottom end 104 of the flower pot 15 and the circumference of the basal layer 72. Desirably, however, the height 44 of the basal rim portion 38 of the basal portion 37 will be in a range of about one-fourth to one-third the height of the base portion 16 of the flower pot cover 10.

Description of FIGS. 6–7

Shown in FIGS. 6 and 7 is a flower pot cover former and band applicator apparatus designated by the reference numeral 112. The flower pot cover former and band applicator apparatus 112 may be constructed and operated similar to the cover forming device described in detail in U.S. Pat. No. 4,733,521 entitled "Cover Forming Apparatus" issued to Weder on Mar. 29, 1988 which is hereby incorporated herein by reference.

The flower pot cover former and band applicator device 112 comprises a band applicator 114 and a flower pot cover former 116. The flower pot cover former 116 has a support platform 118 with an opening 120 formed therein. A band 122 is disposed circumferentially about the opening 120 in the support platform 118.

The sheet of material 12 is positioned on an upper surface 124 on the support platform 118 such that the basal layer 72 on the sheet of material 12 is positioned over the opening 120 in the support platform 118. The flower pot 15 is positioned above the basal layer 72 and is moved in a direction 126 (FIG. 6) into the opening 120 of the flower pot cover former and band applicator device 112. As the flower pot 15 is moved into the opening 120, the basal layer 72 is formed about the bottom end 104 of the flower pot 15 and a portion of the sheet of material 12 is pressed against the sidewall 108 of the flower pot 15 thereby forming the flower pot cover 10 about the flower pot 15. The flower pot cover 10 is then secured about the flower pot 15 by the band 122. The flower pot 15 having the flower pot cover 10 secured thereto is then moved in a direction 128 (FIG. 7) out of the opening 120 in the support platform 118.

Instead of securing the flower pot cover 10 about the flower pot 15 via the band 122, the flower pot cover 10 formed from the sheet of material 12 may be secured to the flower pot 15 by the use of one or more bonding materials. For example, the upper surface 62 of the sheet of material 12 may have a bonding material disposed upon a portion thereof. When the sheet of material 12 is disposed about the flower pot 15, at least a portion of the upper surface 62 of the sheet of material 12 contacts the sidewall 108 of the flower pot 15 and is thereby bonded and held about the flower pot 15 via the bonding material. It should be noted that the bonding material may be disposed either on the upper surface 62 of the sheet of material 12 or on the upper surface 74 of the basal layer 72 or both.

The bonding material may cover a portion of the sheet of material 12 or the bonding material may entirely cover the sheet of material 12. The bonding material may be disposed on the upper surface 62 of the sheet of material 12 in the form of a strip or in the form of spaced apart spots. One method for disposing a bonding material on a sheet of material 12, is described in U.S. Pat. No. 5,111,637 entitled "Method For Wrapping A Floral Grouping", issued to Weder et al., on May 12, 1992, which is expressly incorporated herein by reference.

Description of FIGS. 8–12

Shown in FIG. 8 is the formation of a basal layer 72a on a sheet of material 12a utilizing a flower pot cover forming apparatus 130. The flower pot cover forming apparatus 130 may be constructed in a similar manner as the modified article forming system disclosed in U.S. Pat. No. 4,773,182, entitled "Article Forming System", issued to Weder on Sep. 27, 1988, which is expressly incorporated herein by reference.

A material supply, designated by the reference numeral 132, comprises a roll of material 134 rotatably mounted upon a shaft 136 for permitting material to be rollingly withdrawn from the roll of material 134. The sheet of material 12a is produced from the roll of material 134 and is similar to the sheet of material 12 herein before described. The sheet of material 12a is formed by severing or disconnected a segment from the roll of material 134 using a cutting device 138.

The roll of material 134 has a leading edge 140. In operation, the leading edge 140 is gripped and withdrawn from the roll of material 134 in a direction 142 via rollers 144 and 146. The material is unrolled from the roll of material 134 and fed through rollers 144 and 146 and then through rollers 148 and 150 until a desired length of material to form the sheet of material 12a has been withdrawn from the roll of material 134. The sheet of material 12a is then formed by severing a segment from the roll of material 134 via the cutting device 138. Subsequently, a basal layer 72a is moved in a direction 152 so that the basal layer 72a is disposed upon the upper surface 62a of the sheet of material 12a and affixed thereto via a suitable bonding material, for example.

Once the basal layer 72a has been affixed to the sheet of material 12a, the sheet of material 12a is advanced via rollers 154 and 156 to a flower pot cover forming position of the flower pot cover forming apparatus 130 wherein the sheet of material 12a is positioned above a female die 158 and below a male die 160 of the flower pot cover forming apparatus 130.

To form the sheet of material 12a into the flower pot cover 10, the male die 160 is moved in a direction 162 so that the male die 160 engages the basal layer 72a affixed to the sheet of material 12a and moves the sheet of material 12a into an opening 164 of the female die 158 thereby forming the sheet of material 12a into the flower pot cover 10 as heretofore described. The male die 168 is then retracted and the flower pot cover 10 removed from the flower pot cover forming apparatus 130.

If desired, two separate rolls of material (not shown) with one of the rolls of material having a first material and the other roll of material having a second material may be utilized in the formation of the flower pot cover 10. When employing two separate rolls of material, the first material is withdrawn from the first roll of material and the second material is simultaneously withdrawn from the second roll of material so that the first and the second materials are overlaid and provided in a manner as generally shown herein for severing by the cutting device 138 from the first and the second rolls of material to provide dual sheets of material.

FIG. 9 shows a flower pot cover forming apparatus 130b which is similar to the flower pot cover forming apparatus 130 shown in FIG. 8 except as noted below. When employing the flower pot cover forming apparatus 130b, a sheet of material 12b is formed from the roll of material 134b via tearing a segment from the roll of material 134b along a row of perforations 166. The sheet of material 12b is then advanced to a flower pot cover forming position of the flower pot cover forming apparatus 130b wherein the sheet of material 12b is disposed above a female die 158b and below a male die 160b, as heretofore described. A basal layer 72b is the disposed on an upper surface 62b of the sheet of material 12b.

To form the flower pot cover 10 from the sheet of material 12b, the male die 160b is moved in a direction 162b so that the male die 160b engages the basal layer 72b and moves the basal layer 72b and the sheet of material 12b into an opening 164b of the female die 158b. Thereafter, the male die 160b is retracted and the flower pot cover 10 is removed from the opening 164b of the female die 158b so as to form a flower pot cover as heretofore described.

FIG. 10 shows a flower pot cover forming apparatus 130c similar to the flower pot cover forming apparatus 130 shown in FIG. 8 except that when employing the flower pot cover forming apparatus 130c, a basal layer 72c is disposed automatically via a vacuum apparatus 168 upon an upper surface 62c of a sheet of material 12c.

A segment of material is severed from a roll of material 134c via a cutting assembly 138c so as to form a sheet of material 12c as herein before described. The basal layer 72c is removed from a stack of basal layers (not shown) and deposited on an upper surface 62c of the sheet of material 12c via the vacuum apparatus 168 prior to the sheet of material 12c being positioned in the flower pot cover forming position of the flower pot cover forming apparatus 130c wherein the sheet of material 12c is positioned above a female die 158c and below a male die 160c. Once the basal layer 72c is deposited upon the upper surface 62c of the sheet of material 12c, the vacuum apparatus 168 releases the vacuum and is positioned to receive another basal layer 72c from the stack of basal layers (not shown).

The sheet of material 12c having the basal layer 72c disposed thereon is then advanced to the flower pot cover forming position of the flower pot cover forming apparatus 130c as described above. The basal layer 72c may or may not be bondingly connected to the sheet of material 12c prior to the formation of a flower pot cover 10.

To form a flower pot cover from the sheet of material 12c, the male die 160c is moved in a direction 162c so that the male die 160c engages the basal layer 72c and moves the basal layer 72c and the sheet of material 12c into an opening 164c of the female die 158c so as to form the sheet of material 12c into a flower pot cover having a basal portion similar to the flower pot cover 10 described with reference to FIG. 1. Thereafter, the male die 160c is retracted and the flower pot cover so formed is removed from the opening 164c of the female die 158c.

Figure 11:
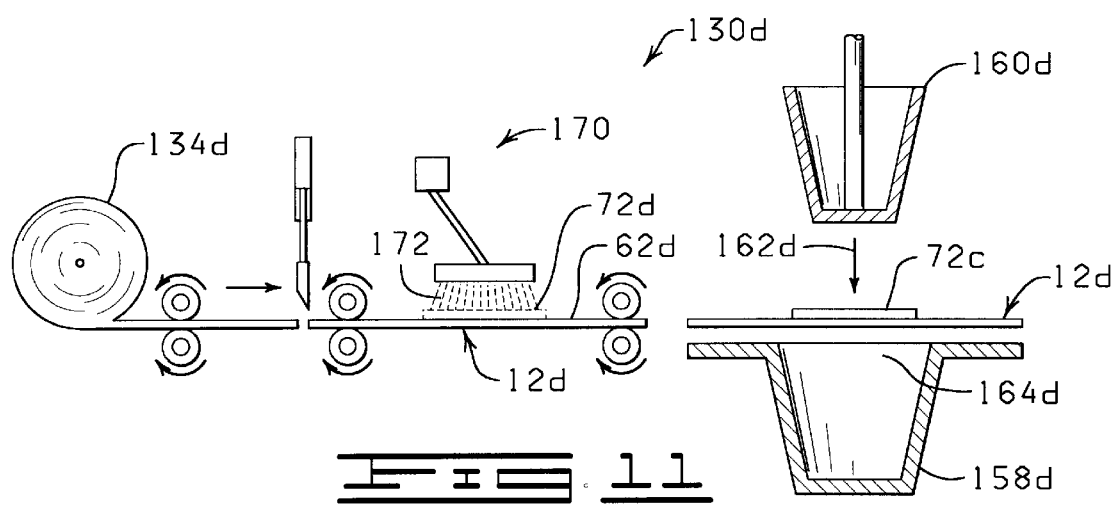
FIG. 11 is a diagrammatic view, partially in cross section, illustrating a spray assembly for forming a basal layer on a sheet of material.

FIG. 11 shows a flower pot cover forming apparatus 130d which is similar to the flower pot cover forming apparatus 130 shown in FIG. 8 except that when employing the flower pot cover forming apparatus 130d, a spray assembly 170 sprays an effective amount of material 172 on an upper surface 62d of a sheet of material 12d so as to form a basal layer 72d on the sheet of material 12d prior to the formation of a flower pot cover from the sheet of material 12d. Any suitable material which can be sprayed onto the sheet of material 12d and cured to provide the basal layer 72d can be utilized. For example, foamable compounds, such as insulating foams or foaming inks, both of which are commercially available and known in the art, can be utilized to form the basal layer 72d.

Once an effective amount of a material 172 has been sprayed onto the sheet of material 12d to form the basal layer 72d and the material 172 has cured, the sheet of material 12d with the basal layer 72d formed thereon is positioned in a flower pot cover forming position wherein the sheet of material 12d is positioned generally above a female die 158d and generally below a male die 160d of the flower pot cover forming apparatus 130d. To form a flower pot cover from the sheet of material 12d, the male die 160d is moved in a direction 162d so that the male die 160d engages the basal layer 72d and thus moves the basal layer 72d and the sheet of material 12d into an opening 164d of the female die 158d to form a flower pot cover. Thereafter, the male die 160d is retracted and the flower pot cover so formed is removed from the opening 164d of the female die 158d.

Figure 12:
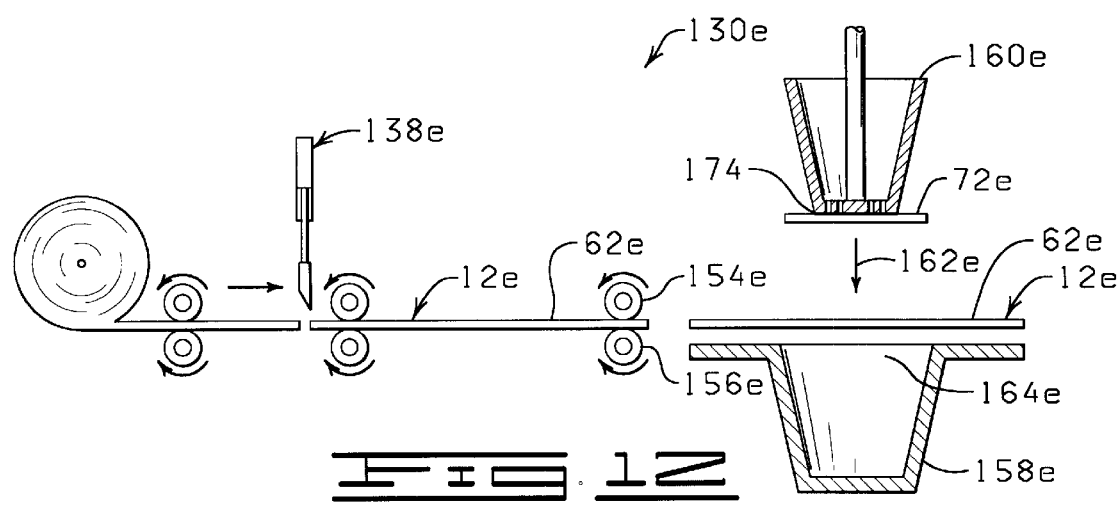
FIG. 12 is a diagrammatic view, partially in cross section, illustrating a basal layer being disposed on a sheet of material when the sheet of material is positioned in a flower pot cover forming position on a flower pot cover forming apparatus.

FIG. 12 shows a flower pot cover forming apparatus 130e similar to the flower pot cover forming apparatus 130 shown in FIG. 8 except that when employing the flower pot cover forming apparatus 130e, a basal layer 72e is disposed automatically on a sheet of material 12e while the sheet of material 12e is in a flower pot cover forming position of the flower pot cover forming apparatus 130e.

The sheet of material 12e is formed by severing a segment of material from a roll of material 134e via a cutting assembly 138e. The sheet of material 12e is then advanced via rollers 154e and 156e so as to be positioned between a female die 158e and a male die 160e of the flower pot cover forming apparatus 130e.

The male die 168e picks up the basal layer 72e from a stack of basal layers (not shown) and deposits the basal layer 72e upon an upper surface 62e of the sheet of material 12e while the sheet of material 12e is in the flower pot cover forming position of the flower pot cover forming apparatus 130e.

Figure 13:
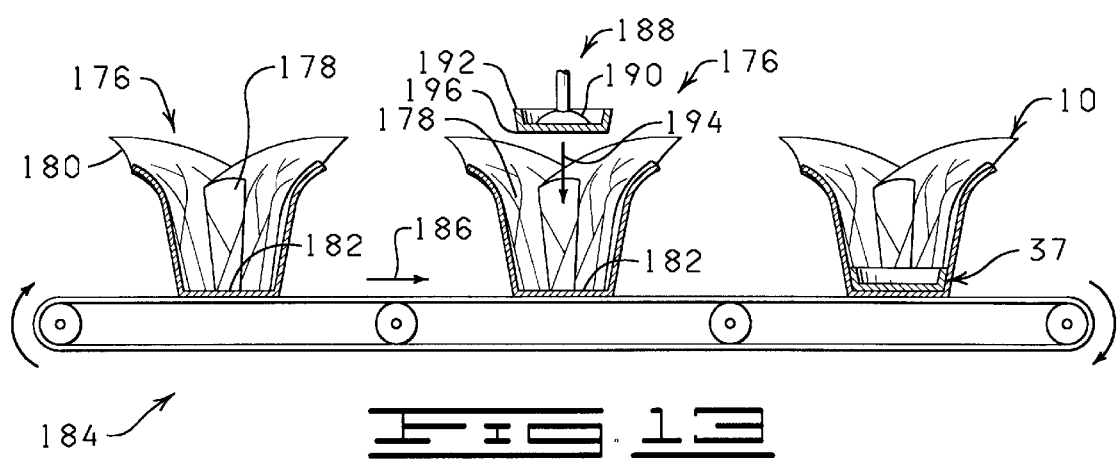
FIG. 13 is a diagrammatic view, partially in cross section, of a basal layer insert being disposed into a preformed flower pot cover so as to form a flower pot cover constructed in accordance with the present invention.

The basal layer 72e may have a preformed "saucer" shape similar to that shown in FIG. 13 which engagingly fits upon a lower end 174 of the male die 160e. Alternatively, the basal layer 72e may be substantially flat as shown in FIG. 12.

To form a flower pot cover from the sheet of material 12e, the male die 160e having the basal layer 72 supported on the lower end 174 thereof, is moved in the direction 162e so that the basal layer engages the sheet of material 12e. Continued movement of the male die 160e in the direction 162e moves the basal layer 72e and the sheet of material 12e into an opening 164e of the female die 158e to form a flower pot cover. Thereafter, the male die 160e is retracted and the flower pot cover so formed is removed from the opening 164e of the female die 158e.

Although the methods for forming the flower pot cover 10 illustrated in FIGS. 8–12 show the material supply being in the form of a roll of material, it is to be understood that other systems may be utilized to provide the material supply. For example, the material supply could also be a plurality of sheets of material 12 stacked in the form of a pad, such as the pad 95 formed from a plurality of sheet of material 12 shown in FIG. 5.

Figure 14:
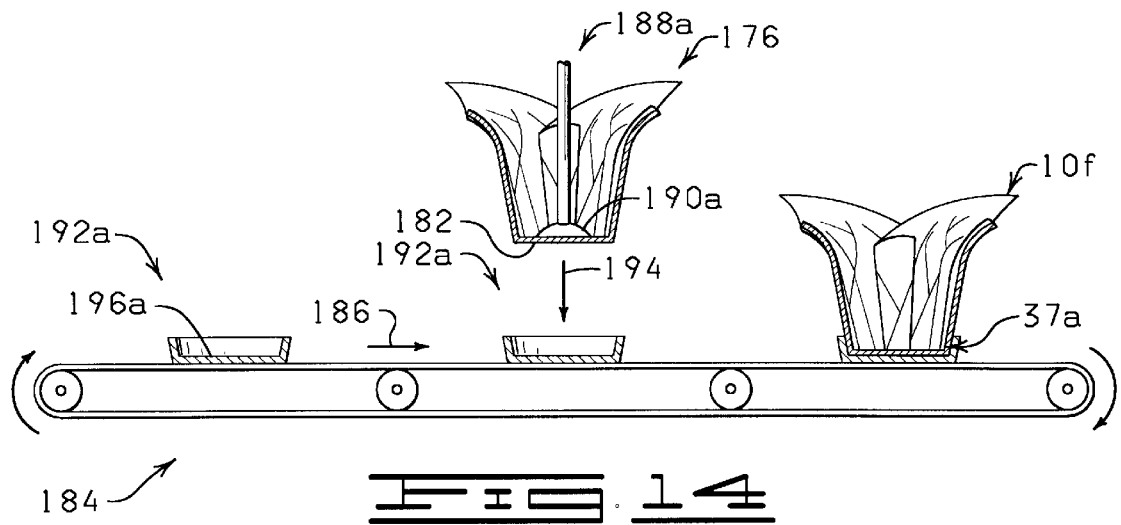
FIG. 14 is a diagrammatic view, partially in cross section, of a preformed flower pot cover being disposed into a basal layer insert so as to form a flower pot cover constructed in accordance with the present invention.
Figure 15:
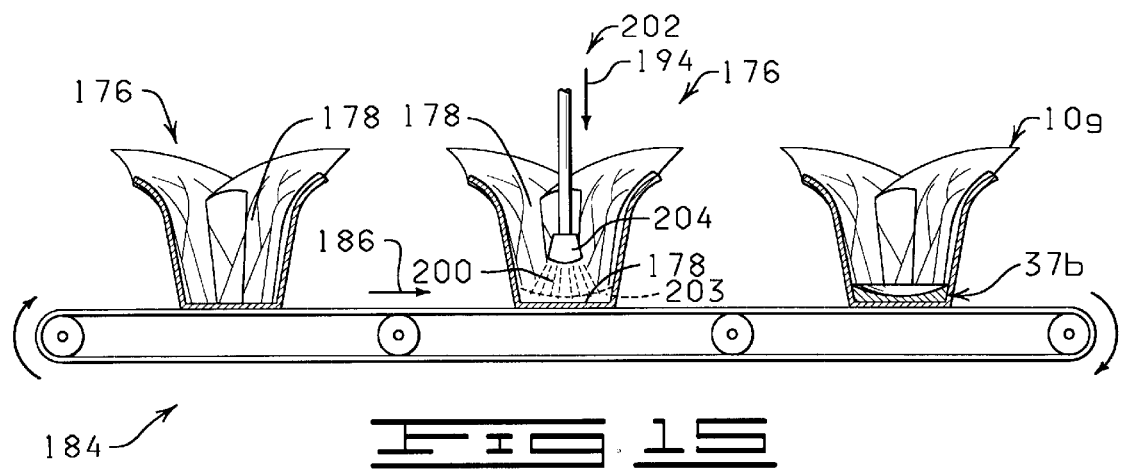
FIG. 15 is a diagrammatic view, partially in cross section, of a spray applicator forming a basal layer in a preformed flower pot cover so as to form a flower pot cover constructed in accordance with the present invention.

Description of FIGS. 13–15

FIG. 13 illustrates a method of forming the flower pot cover 10 of FIGS. 1 and 2 having the basal portion 37 from a preformed flower pot cover 176. The preformed flower pot cover 176 defines a receiving space 178 and has an open upper end portion 180 and a closed bottom end 182.

The preformed flower pot cover 176 may be constructed in a similar manner as the decorative flower pot cover disclosed in U.S. Pat. No. 4,773,182, entitled "Article Forming System", issued to Weder on Sep. 27, 1988, which is expressly incorporated herein by reference.

To form the flower pot cover 10 from the preformed flower pot cover 176, the preformed flower pot cover 176 is disposed on a conveyor assembly 184 and moved in a direction 186 to position the preformed flower pot cover 176 below a basal applicator assembly 188. The basal applicator assembly 188 comprises a vacuum cup 190 which applies a vacuum to hold a saucer shaped basal layer insert 192 thereto. The vacuum cup 190 and the basal layer insert 192 are moved in a direction 194 into and through the receiving space 178 formed in the preformed flower pot cover 176 to a position wherein the basal layer insert 192 is disposed within the receiving space 178 substantially adjacent the bottom end 182 of the preformed flower pot cover 176.

Thereafter, vacuum is removed from the vacuum cup 190 of the basal applicator assembly 188 so that the vacuum cup 190 releases the basal layer insert 192. The vacuum cup 190 of the basal applicator assembly 188 is then returned to a position wherein the vacuum cup 190 of the basal applicator assembly 188 receives another basal layer insert 192 for inserting into another preformed flower pot cover 176.

To facilitate the positioning of the basal layer insert 192 within the receiving space 178 of the flower pot cover 176 so that the basal layer insert 192 is disposed substantially adjacent the bottom end 182 of the preformed flower pot cover 176, the basal layer insert 192 has a circumference equal to or less than the interior circumference of the bottom end 182 of the preformed flower pot cover 176. The basal layer insert 192 may be secured to the bottom end 182 of the preformed flower pot cover 176 by coating a lower end 196 of the basal layer insert 192 and/or the bottom end 182 of the preformed flower pot cover 176 with a bonding material prior to positioning the basal layer insert 192 substantially adjacent the bottom end 182 of the preformed flower pot cover 176.

FIG. 14 illustrates a method for forming a flower pot cover 10f from the preformed flower pot cover 176 having a basal portion 37b formed from a basal layer insert 192a. The basal layer 192a is substantially identical in construction as the basal layer 192 described with reference to FIG. 13 except that the basal layer 192a is provided with an interior circumference which is at least equal to the exterior circumference of the bottom end 182 of the preformed flower pot cover 176.

To form the flower pot cover 10f, the saucer shaped basal layer insert 192a is disposed on the conveyor assembly 184 and moved in the direction 186 to position the basal layer insert 192a below a preformed flower pot cover applicator assembly 188a. A vacuum cup 190a of the preformed flower pot cover applicator assembly 188a, which applies a vacuum to hold the preformed flower pot cover 176 thereto, and the preformed flower pot cover 176 are moved in a direction 194a whereby the bottom end 182 of the preformed flower pot cover 176 is positioned with the basal layer insert 192a substantially as shown.

When the basal layer insert 192a is positioned about the bottom end 182 of the preformed flower pot cover 176, the vacuum from the vacuum cup 190a of the preformed flower pot cover applicator assembly 188a is released and the vacuum cup 190a is retracted to a loading position (not shown) for obtaining another preformed flower pot cover 176.

A bonding material may be disposed upon the bottom end 182 of the preformed flower pot cover 176 for bonding the bottom end 182 of the preformed flower pot cover 176 to the basal layer insert 192a. Alternatively, a bonding material may be disposed upon a lower end 196a of the basal layer insert 192a for bonding the basal layer insert 192a about the bottom end 182 of the preformed flower pot cover 176. Alternatively, a cohesive bonding material may be disposed upon both the lower end 196a of the basal layer insert 192a and on the bottom end 182 of the preformed flower pot cover 176 for bonding the basal layer insert 192a to the preformed flower pot cover 176.

Illustrated in FIG. 15 is a method for forming a flower pot cover 10g having a basal portion 37b from the preformed flower pot cover 176 and a sprayable material 200. To form the flower pot cover 10g from the preformed flower pot cover 176 and the sprayable material 200, the preformed flower pot cover 176 is disposed on the conveyor assembly 184 and moved in the direction 186 to position the preformed flower pot cover 176 below a spray applicator assembly 202. The spray applicator assembly 202 comprises a spray applicator head 204 which is moved in the direction 194 through the receiving space 178 formed in the preformed flower pot cover 176. While the spray applicator head 204 of the applicator assembly 202 is disposed within the receiving space 178 of the preformed flower pot cover 176, an effective amount of the sprayable material 200 capable of providing a basal layer 203 is sprayed about the bottom end 178 of the preformed flower pot cover 176 via the spray applicator head 204 so as to form the flower pot cover 10g having the basal portion 37b. Thereafter, the spray applicator head 204 is retracted to a position (not shown) for awaiting the next preformed flower pot cover 176.

Description of FIGS. 16–19

Illustrated in FIG. 16 is a flower pot cover 10h constructed in accordance with the present invention. The flower pot cover 10h is formed from a sheet of material 12h (FIG. 17) shaped to define a receiving space 14h adapted to receive an object, such as a flower pot 15 and a floral grouping 98.

The flower pot cover 10h has a base or lower portion 16h having an outer peripheral surface 18h. The base portion 16h has an upper end 20h, a lower end 22h and a continuous sidewall 24h which defines the outer peripheral surface 18h of the base portion 16h. A skirt or upper portion 30h of the flower pot cover 10h is positioned circumferentially about the upper end 20h of the base portion 16h of the flower pot cover 10h and extends generally outwardly and upwardly therefrom substantially as shown in FIG. 16. The base portion 16h of the flower pot cover 10h is further provided with a bottom 32h.

The flower pot cover 10h further includes a basal portion 37h having a basal rim portion 38h and a basal base or bottom portion 39h. The basal base portion 39h is disposed substantially adjacent the bottom 32h of the base portion 16h of the flower pot cover 10h and the rim portion 38h of the basal portion 37h extends circumferentially about an interior surface (not shown) of the lower end 22h of the base portion 16h of the flower pot cover 10h. The basal rim portion 38h has an upper end 40h, a lower end 42h and a height (not shown) extending generally between the upper and lower ends 40h and 42h, respectively, of the basal rim portion 38h.

The skirt portion 30h of the flower pot cover 10h has a first end 46h, a second end 48h and an outer peripheral edge 50h. An upper sleeve portion 206 of the flower pot cover 10h extends about the floral grouping 98 disposed within the receiving space 14h of the flower pot cover 10h so as to provide the floral grouping with a protective covering. Typically, the upper sleeve portion 206 of the flower pot cover 10h is removably connected to the outer peripheral edge 50h of the skirt portion 30h of the flower pot cover 10h.

To facilitate the removal of the upper sleeve portion 206 from the skirt portion 30h of the flower pot cover 10h, the flower pot cover 10h is provided with perforations 208 extending generally between the skirt portion 30h and the upper sleeve portion 206 substantially as shown. The upper sleeve portion 206 remains formed in a position extending about and above the floral grouping 98 until it is desired to remove the upper sleeve portion 206 from the flower pot cover 10h. The upper sleeve portion 206 may be removed from the flower pot cover 10h by tearing along the perforations 208 extending between the skirt portion 30h and the upper sleeve portion 206 of the flower pot cover 10h. Once the perforations are torn, the upper sleeve portion 206 may be lifted from the flower pot cover 10h and removed therefrom.

Illustrated in FIG. 17 is the sheet of material 12h which is utilized in the formation of the flower pot cover 10h (FIG. 16). The sheet of material 12h has a first end 54h, a second end 56h, a first side 58h, a second side 60h, an upper surface 62h and a lower surface (not shown). The sheet of material 12h has a length 66h extending between the first and the second sides 58h and 60h, respectively, thereof; and a width 68h extending generally between the first and the second ends 54h and 56h, respectively, thereof. The first end 54h, the second end 56h, the first side 58h and the second side 60h cooperate to provide the sheet of material 12h with an outer peripheral edge 70h.

The sheet of material 12h is further provided with a basal layer 72h for forming the basal portion 37h of the flower pot cover 10h. The basal layer 72h is disposed on the portion of the sheet of material 12h to be formed into a bottom 32h of a base portion 16h of the flower pot cover 10h, which will be discussed in more detail hereinafter. The basal layer 72h may be a separate sheet of material which is affixed to the sheet of material 12h and/or the basal layer 72h may be formed integrally with the sheet of material 12h.

The basal layer 72h has an upper surface 74h and may be provided with a lower surface (not shown) when the basal layer 72h is formed from a separate sheet of material which is affixed to the sheet of material 12h; and the basal layer 72 may be affixed to the sheet of material 12h via a suitable bonding material.

The basal layer 72h, which has a diameter 78h and a basal periphery 80h, and the portion of the sheet of material 12h either immediately below the basal layer 72h, or integral thereto, cooperate to define the basal portion 37h of the flower pot cover 10h. Thus, the basal portion 37h of the flower pot cover 10h has a thickness greater than the thickness of the continuous sidewall 24h of the base portion 16h of the flower pot cover 10h.

The sheet of material 12h is further provided with a peripheral portion 90h which forms the continuous sidewall 24h of the base portion 16h of the flower pot cover 10h and the skirt portion 30h of the flower pot cover 10h when the sheet of material 12h is formed into the flower pot cover 10h. The peripheral portion 90h of the sheet of material 12h surrounds the basal layer 72h of the sheet of material 12h and extends a distance 210 outwardly from the basal periphery 80h of the basal layer 72h to a periphery 212 of the peripheral portion 90h of the sheet of material 12h.

The sheet of material 12h is further provided with a sheet extension portion 216 which forms the upper sleeve portion 206 of the flower pot cover 10h when the sheet of material 12h is formed into the flower pot cover 10h. The sheet extension portion 216 of the sheet of material 12h generally surrounds the periphery 212 of the peripheral portion 90h of the sheet of material 12h and extends a distance 218 outwardly therefrom to the outer peripheral edge 70h of the sheet of material 12h. The sheet of material 12h is further provided with perforations 208 extending about the periphery 212 of the peripheral portion 90h of the sheet of material 12h. As previously stated, the upper sleeve portion 206 of the flower pot cover 10h can be removed from the skirt portion 30h of the flower pot cover 10h by tearing along the perforations 208 extending between the skirt portion 30h and the upper sleeve portion 206.

Typically, the sheet extension portion 216 is integrally formed with the peripheral portion 90h of the sheet of material 12h. However, it is to be understood that the sheet extension portion 216 may be formed from a separate sheet of material which is positioned and attached circumferentially about the periphery 212 of the peripheral portion 90h of the sheet of material 12h.

A bonding material 220, such as an adhesive (FIG. 17), may be disposed on a portion of the upper surface 62h of the sheet extension portion 216 of the sheet of material 12h. Typically, the bonding material 220 extends circumferentially near the outer peripheral edge 70h of the sheet of material 12h.

The flower pot cover 10h may be formed from the sheet of material 12h by any method which has been described above or which is known in the art. For example, the sheet of material 12h can be formed into the flower pot cover 10h by the method disclosed in U.S. Pat. No. 5,073,161, entitled "Apparatus for Making a Flower Pot or Flower Pot Cover With Controlled Pleats", issued to Weder et al., Dec. 17, 1991, which is expressly incorporated herein by reference.

Illustrated in FIG. 18 is the flower pot cover 10h which has been formed from the sheet of material 12h. Once the sheet of material 12h has been formed into the flower pot cover 10h, the basal portion 37h and the peripheral portion 90h of the sheet of material 12h forms the base portion or lower portion 16h and the skirt portion 30h of the flower pot cover 10h in a similar manner as the basal portion 37 and the peripheral portion 90 of the sheet of material 12 forms the base portion 16 and the skirt portion 30 of the flower pot cover 10, herein before described with reference to FIG. 1. The sheet extension portion 216 of the sheet of material 12h extends a distance 218 outwardly from the outer peripheral edge 50h of the skirt portion 30h of the flower pot cover 10h when the sheet of material 12h has been formed into the flower pot cover 10h.

As shown in FIG. 19, the sheet extension portion 216 forms the upper sleeve portion 206 of the flower pot cover 10h, and provides a protective covering for the floral grouping 98 disposed in the receiving space 14h of the flower pot cover 10h. To form the sheet extension portion 216 into the upper sleeve portion 206, the flower pot 15 having the floral grouping 98 disposed therein is disposed in the receiving space 14h of the flower pot cover 10h so that the lower end 100 of the flower pot 15 is disposed generally adjacent the basal portion 37h formed in the lower end 22h of the base portion 16h of the flower pot cover 10h. The sheet extension portion 216 is then lifted and formed about the floral grouping 98 so that a portion of the outer peripheral edge 70h of the sheet of material 12h which forms the sheet extension portion 216 of the flower pot cover 10h extends above the floral grouping 98 and forms an open upper end 222.

The open upper end 222 may be closed by bondingly connecting adjacent portions of the open upper end 222 via the bonding material 220 located near the open upper end 222 of the upper sleeve portion 206 of the flower pot cover 10h, substantially as shown in FIG. 16.

In addition to the perforations 208, the upper sleeve portion 206 may also include perforations (not shown) extending between the perforations 208 and the open upper end 222 of the upper sleeve portion 206 so as to further assist in the removal of the upper sleeve portion 206 from the flower pot cover 10h.

Description of FIGS. 20 and 21

Shown in FIG. 20 and designated by the general reference number 10i is a flower pot cover constructed in accordance with the present invention. The flower pot cover 10i is substantially identical in construction as the flower pot cover 10h with the exception that the flower pot cover 10i is further provided with a crimped portion 224 disposed above the flower pot 15 and extending a distance radially inwardly toward a central portion (not shown) of the flower pot encased by the flower pot cover 10i substantially as shown.

The flower pot cover 10i is formed from a sheet of material 12i shown in FIG. 21. The sheet of material 12i is substantially identical in construction to the sheet of material 12h except that the sheet of material 12i is generally circular in shape; the sheet of material 12i is provided with a drawstring 226 extending circumferentially near an outer peripheral edge 70i thereof for closing an upper end 222a of the flower pot cover 10i formed from the sheet of material 12i; and the sheet of material 12i is further provided with a bonding material 228 extending about a peripheral portion 90i surrounding a basal layer 72i.

The crimped portion 224, which holds the flower pot cover 10i about the flower pot 15, may be formed by bringing together portions of the flower pot cover 10i near and about the bonding material 228 so that these portions of the flower pot cover 10i are disposed adjacent each other. The adjacent portions of the flower pot cover 10i are then bondingly connected via the bonding material 228 disposed thereon so as to form the crimped portion 224.

Other embodiments of the flower pot cover 12i are possible in which the sheet of material 12i or sheet extension portion 216i may be crimped and the present invention is not limited only to those described herein. For example, a band or a drawstring may be placed about a portion of the flower pot cover extending above the upper end of the flower pot with the band or drawstring engaging the portion of the flower pot cover extending above the flower pot so that the band forms the crimped portion 224 in the flower pot cover 10i. When the drawstring is utilized in the formation of the crimped portion, the drawstring must be drawn so as to form a plurality of overlapping folds in the flower pot cover. Once drawn, the drawstring may be secured by tying the drawstring into a bow, a knot or the like. Other versions of crimping are illustrated and described in the co-pending patent application entitled "Covering For Flower Pot and Floral Grouping", Ser. No. 08/037,067, filed by the Applicant on Mar. 25, 1993.

After the sheet extension portion 212i is formed into the upper sleeve portion 220i, the drawstring 226 may be drawn to close the upper end 222i of the upper sleeve portion 206i; and the upper end 222 may be securely closed by tying the drawstring 226 into a bow, a knot, or the like. Although it is preferred to close the upper end 222 by way of the first bonding material 217 or the drawstring 226, it should be understood that the upper end 222 may be closed by any means known in the art.

Description of FIGS. 22–26

Shown in FIGS. 22–24 and designated by the general reference numeral 10j is a thermoplastic flower pot cover constructed in accordance with the present invention. The flower pot cover 10j is formed from a sheet of material 12j (FIGS. 25 and 26) shaped to define a receiving space 14k adapted to receive an object such as a growing medium 15a (FIG. 23) or the flower pot 15 (FIG. 24).

The flower pot cover 10j is provided with a rigid base or lower portion 16j having an upper end 20j, a lower end 22j and a continuous sidewall 24j. The sidewall 24j of the base portion 16j of the flower pot cover 10i has a thickness 26j (FIG. 23). A tapered, flexible skirt portion 30j of the flower pot cover 10j extends circumferentially about the upper end 20j of the base portion 16j of the flower pot cover 10j in a generally upwardly and outwardly direction substantially as shown. The base portion 16j of the flower pot cover 10j is further provided with a bottom 32j (FIGS. 23 and 24) having a thickness 34j which is substantially equal to or greater than the thickness 26j of the sidewall 24j of the base portion 16j.

As shown in FIG. 23, the flower pot cover 10j may be adapted to contain the growing medium 15a within the receiving space 14j. In this instance, the flower pot cover 10j may further be provided with a drain hole 232 formed through a portion of the bottom 321 of the base portion 16j of the flower pot cover 10j.

The skirt portion 30j of the flower pot cover 10j is formed integrally with the base portion 16j and has a first end 46j, a second end 48j and an outer peripheral edge 50j. The skirt portion 30j of the flower pot cover 10j has a diminishing thickness extending from the first end 46j towards the second end 48j of the skirt portion 30j so that the flower pot cover 10j has a first skirt portion thickness 234 substantially equal to the thickness 26j of the sidewall 24j of the base portion 16j and a second skirt portion thickness 236 which is less than the first skirt portion thickness 234.

The flower pot cover 10j is preferably constructed from a sheet of thermoplastic material 12j (FIGS. 25 and 26) which has been thermal formed into the flower pot cover 10i by a mold system 240 comprising a male mold 242 and a female mold 244. The sheet of material 12j has a first end 54j, a second end 56j, an upper surface 62j and a lower surface 64j. The sheet of material 12j is further provided with a width 68j extending between the first and the second ends 541 and 56j, respectively.

The sheet of material 12j is further provided with a basal layer 72j positioned on a portion of the sheet of material 12j to be formed into the base portion 16j of the flower pot cover 10j. The basal layer 72j has an upper surface 74j and a lower surface 76j (FIG. 26). The lower surface 76j is positioned substantially adjacent the upper surface 62j of the sheet of material 12j and is affixed to the sheet of material 12j via any suitable bonding material.

The basal layer 72j has a diameter 78j and a periphery 80i. The portion of the sheet of material 12j immediately below the basal layer 72j cooperates with the basal layer 72j to define a basal portion 37j of the flower pot cover 10j having a thickness 88j. When the sheet of material 12j is formed into the flower pot cover 10j, the basal portion 37j of the sheet of material 12j forms the bottom 32j and at least a portion of the sidewall 24j of the flower pot cover 10j.

The sheet of material 12j is further provided with a tapered peripheral portion 90j which forms the flexible, tapered skirt portion 30j of the flower pot cover 10j when the sheet of material 12j is formed into the flower pot cover 10j. The tapered peripheral portion 90j surrounds the basal portion 37j and tapers outwardly from the basal periphery 80j of the basal portion 37j to the outer peripheral edge 70j of the sheet of material 12j. In other words, the peripheral portion 90j of the sheet of material 12j has a first thickness 234 extending along the basal periphery 80j greater than a second thickness 236 extending along the outer peripheral edge 70j of the sheets of material 12j.

The sheet of material 12j may be constructed of a single layer of material, as substantially shown in FIG. 25, or a plurality of layers of the same and/or different types of materials, as substantially shown in FIG. 26. The thickness of the sheet of material 12j and the basal portion 86j thereof may vary widely and any thickness of the sheet of material 12j and the basal portion 86j thereof may be utilized in accordance with the present invention so long as the sheet of material 12j is formable into the flower pot cover 10j, as described herein. When the sheet of material 12j is constructed of a plurality of layers of material, each layer of material may be connected to an adjacent layer of material via a bonding material.

It is to be understood that the flower pot cover 10j may be formed from any process formerly disclosed herein and from any process which is known in the art. For example, the flower pot cover 10j may be formed from an injection molding process, a blow molding process, a thermal forming process, an extrusion process, a vacuum process or combinations thereof. All of these processes are well known in the art. Therefore, no additional comments on molding the sheet of thermoplastic material 12j and forming the sheet of material 12j into the flower pot cover 10j are deemed necessary in order to teach a person skilled in the art how to manufacture the flower pot cover 10j.

Description of FIGS. 27–28

Shown in FIG. 27 is a flower pot cover constructed in accordance with the present invention and generally designated by the reference numeral 10k. The flower pot cover 10k defines a receiving space 14k adapted to receive an object, such as a growing medium 15a (FIG. 27) or the flower pot 15 (FIG. 28).

The flower pot cover 10k has a base or lower portion 16k desirably constructed of a rigid material. The base portion 16k has an upper end 20k, a lower end 22k and a continuous sidewall 24k. The sidewall 24k of the base portion 16k of the flower pot cover 10k has a thickness 26k.

The flower pot cover 10k is further provided with a flexible skirt or upper portion 30k having a thickness 36k which is less than the thickness 26k of the sidewall 24k of the base portion 16k of the flower pot cover 10k and which is desirably tapered so as to provide the skirt portion 30k with a billowy appearance. The skirt portion 30k extends from the upper end 20k of the base portion 16k of the flower pot cover 10k in a generally outwardly and upwardly direction substantially as shown. The base portion 16k of the flower pot cover 10k is further provided with a bottom 32k having a thickness 34k which is greater than the thickness 26k of the sidewall 24k of the base portion 16k.

The skirt portion 30k has a first end 46k, a second end 48k and an inner surface 252 defining a generally circularly shaped skirt portion opening 254 formed through a central portion thereof. The opening 254 of the skirt portion 30k, near the first end 46k thereof, has a diameter substantially equal to an outside diameter of the sidewall 24k of the base portion 16k, near the upper end 20k thereof, so that the inner surface 252 of the skirt portion 30k, near the first end 46k thereof, matingly engages the sidewall 24k of the base portion 16k, near the upper end 20k thereof substantially as shown.

To form the flower pot cover 10k, the skirt portion 30k is disposed generally above the base portion 16k and positioned on the upper end 20k of the base portion 16k so that the upper end 20k of the base portion 16k extends upwardly into the opening 254 defined by inner surface 252 of the skirt portion 30k. In this position, the inner surface 252 of the skirt portion 30k, near the first end 46k thereof, extends circumferentially about and over a portion of the sidewall 24k of the base portion 16k, generally near the upper end 20k thereof. The skirt portion 30k may be secured to the base portion 16k by any means known in the art, such as by gluing or fusing the inner surface 252 of the skirt portion 30k to the outer peripheral surface 18k of the sidewall 24k of the base portion 16k. Furthermore, the skirt portion 30k may be secured to the base portion 16k via a wrapping material (not shown), as disclosed in U.S. Pat. No. 5,038,933, issued to Weder, Aug. 13, 1991, and which is expressly incorporated herein by reference.

The skirt portion 30k may be constructed from any material which may be secured to the sidewall 24k of the flower pot cover 10k. For example, the skirt portion 30k may be constructed of films, papers, cloths, organic polymers, cellophanes, metal foils, thermoplastics and/or other flexible materials.

Description of FIGS. 29–30

Shown in FIGS. 29 and 30, is a flower pot cover 10m constructed in accordance with the present invention. The flower pot cover 10m defines a receiving space 14m adapted to receive an object, such as the growing medium 15a (FIG. 29) or the flower pot 15 (FIG. 30).

The flower pot cover 10m has a base or lower portion 16m desirably constructed of a rigid material. The base portion 16m has an upper end 20m, a lower end 22m and a continuous sidewall 24m having an inner surface 256. The sidewall 24m of the base portion 16m of the flower pot cover 10m has a thickness 26m.

The flower pot cover 10m is further provided with a flexible skirt or upper portion 30m having a thickness 36m which is less than the thickness 26m of the sidewall 24m of the base portion 16m of the flower pot cover 10m and which is desirably tapered so as to provide the skirt portion 30m with a billowy appearance. The skirt portion 30m extends circumferentially about the upper end 20m of the base portion 16m of the flower pot cover 10m in a generally outwardly and upwardly direction substantially as shown. The base portion 16m of the flower pot cover 10m is further provided with a bottom 32m having a thickness 34m which is greater than the thickness 26m of the sidewall 24m of the base portion 16m.

The skirt portion has a first end 46m, a second end 48m, an outer surface 258 and an inner surface 260 defining a generally circularly shaped skirt portion opening 254m formed through a central portion thereof. The outer peripheral surface 18m of the skirt portion 30m, near the first end 46m thereof, has a diameter substantially equal to a diameter of the inner surface 256 of sidewall 24m of the base portion 16m, near the upper end 20m thereof, so that the outer surface 258 of the skirt portion 30m, near the first end 46m thereof, matingly engages the inner surface 256 of the sidewall 24m of the base portion 16m, near the upper end 20m thereof.

To form the flower pot cover 10m, the skirt portion 30m is disposed generally above the base portion 16m and positioned on the upper end 20m of the base portion 16m so that the first end 46m of the skirt portion 30m of the flower pot cover 10m extends downwardly into the receiving space 14m of the base portion 16m of the flower pot cover 10m. In this position, the skirt portion 30m, near the first end 46m thereof, matingly engages a portion of the inner surface 256 of the sidewall 24m of the base portion 16m, generally near the upper end 20m thereof. The skirt portion 30m may be secured to the base portion 16m by any means known in the art, such as by gluing or fusing the skirt portion 30m to the inner surface 256 of the sidewall 24m of the base portion 16m of the flower pot cover 10m. Furthermore, the skirt portion 30m may be secured to the base portion 16m via a wrapping material (not shown), as substantially disclosed in U.S. Pat. No. 5,038,933, issued to Weder, Aug. 13, 1991, and which is expressly incorporated herein by reference.

The skirt portion 30m may be constructed from any material which may be secured to the sidewall 24m of the flower pot cover 10m. For example, the skirt portion 30m may be constructed of films, papers, cloths, organic polymers, cellophanes, metal foils, thermoplastics and/or other flexible materials.

Description of FIGS. 31–32

Shown in FIGS. 31 and 32, is a flower pot cover 10n constructed in accordance with the present invention. The flower pot cover 10n defines a receiving space 14n adapted to receive an object, such as the growing medium 15a (FIG. 31) or the flower pot 15 (FIG. 32).

The flower pot cover 10n has a base or lower portion 16n which is desirably constructed of a rigid material. The base portion 16n has an upper end 20n, a lower end 22n and a continuous sidewall 24n having an inner surface 256n and an outer surface 247n. The sidewall 24n of the base portion 16n of the flower pot cover 10n has a thickness 26n.

The flower pot cover 10n is further provided with a flexible skirt or upper portion 30n having a thickness 36n which is less than the thickness 26n of the sidewall 24n of the base portion 16n of the flower pot cover 10n and which is desirably tapered so as to provide the skirt portion 30n with a billowy appearance. The skirt portion 30n extends from the upper end 20n of the base portion 16n of the flower pot cover 10n in a generally outwardly and upwardly direction substantially as shown. The base portion 16n of the flower pot cover 10n is further provided with a bottom 32n having a thickness 34n which is greater than the thickness 26n of the sidewall 24n of the base portion 16n.

The skirt portion 30n has a first end 46n, a second end 48n, an outer layer 264, an inner layer 266 and a cavity 268 disposed between the outer layer 264 and the inner layer 266 of the skirt portion 30n adapted to receive the upper end 20n of the base portion 16n of the flower pot cover 10n. The inner layer 266 of the skirt portion 30n of the flower pot cover 10n defines a generally circularly shaped skirt portion opening 270 formed through a central portion thereof.

The inner layer 266 of the skirt portion 30n, near the first end 46n thereof, has a diameter substantially equal to or less than an inner diameter of the sidewall 24n of the base portion 16n, near the upper end 20n thereof, so that the inner layer 266 of the skirt portion 30n matingly engages the inner surface 256n of the sidewall 24n of the base portion 16n of the flower pot cover 10n when the skirt portion 16n is positioned on the upper end 20n of the base portion 16n.

Likewise, the outer layer 264 of the skirt portion 30n, near the first end 46n thereof, has a diameter substantially equal to or greater than an outside diameter of the sidewall 24n of the base portion 16n, near the upper end thereof, so that the outer layer 264 of the skirt portion 30n is matingly engaged with the outer peripheral surface 18n of the sidewall 24n of the base portion 16n of the flower pot cover 10n when the skirt portion 16n is positioned on the upper end 20n of the base portion 16n.

To form the flower pot cover 10n, the skirt portion 30n is disposed generally above the base portion 16n and positioned on the upper end 20n of the base portion 16n so that the upper end 20n of the sidewall 24n of the base portion 16n is disposed within the cavity 268 formed between the inner and the outer layers 264 and 266, respectively, of the skirt portion 30n. In this position, the outer layer 264 of the skirt portion 30n, near the first end 46n thereof, matingly engages the sidewall 24n of the base portion 16n, generally near the upper end 20n thereof; and, the inner layer 266 of the skirt portion 30n, near the first end 46n thereof, matingly engages a portion of the sidewall 24n of the base portion 16n, generally near the upper end 20n thereof. The skirt portion 30n is then secured to the base portion 16n by any means known in the art, such as by gluing or fusing the outer layer 264 and the inner layer 266 of the skirt portion 30n to the sidewall 24n of the base portion 16n of the flower pot cover 10n.

Description of FIGS. 33–35

Shown in FIGS. 33–35 and designated by the general reference numeral 10p is a flower pot cover constructed in accordance with the present invention. The flower pot cover 10p defines a receiving space 14p adapted to receive an object, such as a floral grouping (not shown).

The flower pot cover 10p has a rigid base or lower portion 16p having an upper end 20p, a lower end 22p and a continuous sidewall 24p. A thin, flexible skirt portion 30p of the flower pot cover 10p extends circumferentially about the upper end 20p of the base portion 16p of the flower pot cover 10p in a generally upwardly and outwardly direction substantially as shown. The base portion 16p of the flower pot cover 10p is further provided with a bottom 32p shown in phantom in FIG. 33.

The skirt portion 30p of the flower pot cover 10p is formed integrally with the base portion 16p and has a first end 46p, a second end 48p and an outer peripheral edge 50p. The skirt portion 18p of the flower pot cover 10p has a thickness (not shown) less than the thickness of the sidewall 24p of the base portion 16p. The skirt portion 30p of the flower pot cover 10p is constructed of a plurality of contiguously disposed flexible skirt segments 274 with each of the skirt segments 274 circumferentially disposed about the upper end 20p of the sidewall 24p of the base portion 16p of the flower pot cover 10p and extending upwardly and outwardly therefrom substantially as shown.

Each of the skirt segments 274 forming the skirt portion 30p of the flower pot cover 10p has a first side 276 and a second side 278. The skirt segments 274 may be spatially disposed about the sidewall 24p of the base portion 16p so that each skirt segment 274 is spaced a distance from the adjacent skirt segment 274 as substantially shown in FIG. 33. Alternatively, the skirt segments 274 may be disposed about the sidewall 24p of the base portion 16p so that the first side 276 of each skirt segment 274 abuttingly engages the second side 278 of the adjacent skirt segment 274 as substantially shown in FIG. 34. Furthermore, the skirt segments 274 may be disposed about the sidewall 24p of the base portion 16p so that the first side 276 of each skirt segment 274 overlaps the second side 278 of the adjacent skirt segment 274 as substantially shown in FIG. 35.

It should be understood that the flower pot cover 10p is desirably constructed from a thermoplastic sheet of material which has been thermal formed or molded into the flower pot cover 10p. However, it also should be understood that the flower pot cover 10p may be constructed from any process formerly disclosed herein, such as a vacuum forming or injection molding process. Processes for forming plastics, resins or the like into objects, such as the flower pot cover 10p, are well known in the art. Therefore, no further comments concerning these processes are deemed necessary to teach a person skilled in the art how to build or use the flower pot cover 10p.

Preferably, the base portion 16p and the skirt portion 18p of the flower pot cover 10p are integrally formed. However, it should be understood that the base portion 16p and the skirt portion 30p of the flower pot cover 10p may not be integrally formed and in this instance, the base portion 16p and the skirt portion 30p may be bonded together via a suitable bonding material.

The skirt portions of the flower pot covers described above can have any suitable geometric appearance and the skirt portions appearance will depend on the configuration of the sheet of material from which the flower pot cover is formed. For example, the skirt portion 30 of the flower pot cover 10 is provided with a four-cornered appearance and the skirt portion 30k of the flower pot cover 10k is provided with a generally scalloped shaped appearance.

A scent may be applied to the flower pot covers disclosed herein so that the flower pot covers exude a fragrance. For example, the flower pot covers may be scented with a floral scent, (flower blossoms, or any portion of a plant), food scent (chocolate, sugar, fruits), herb or spice scent (cinnamon), or the like. Such scents are well known in the art and are commercially available.

The scent may be disposed upon the sheet of material 12 by spraying the scent thereupon, painting the scent thereupon, brushing the scent thereupon, lacquering the scent thereupon, immersing the sheet of material in a scent-containing liquid, exposing the sheet of material to scent-containing gas, or any combinations thereof.

The scent may be contained within a lacquer, or other liquid, before it is disposed upon the sheet of material 12. The scent may also be contained within a dye, ink, and/or pigment (not shown). Such dyes, inks and pigments are known in the art, and are commercially available, and may be disposed upon or incorporated in the sheet of material 12 or other sheets described herein by any method described herein or known in the art.

Changes may be made in the various elements, components, parts and assemblies described herein or in the steps or sequences of steps in the methods described herein without departing from the spirit and the scope of the invention as defined in the following claims.

What is claimed is:

1. A method for forming a shape-sustaining flower pot cover, the method comprising the steps of:
   providing a sheet of material having an upper surface, a lower surface, and an outer peripheral edge, the sheet of material further comprising:
     a basal portion having a periphery and a first thickness; and
     a peripheral portion extending from the periphery of the basal portion to the outer peripheral edge of the sheet of material, the peripheral portion having a second thickness wherein the second thickness of the peripheral portion is less than the first thickness of the basal portion;
   forming the sheet of material into a shape sustaining flower pot cover having an upper end, a lower end, a bottom and a flower pot receiving space shaped to receive a flower pot, the basal portion of the sheet of material forming the bottom of the shape-sustaining flower pot cover for providing increased tear-resistance of the lower end of the shape-sustaining flower pot cover.

2. The method of claim 1 wherein the method further comprises the step of:
   providing a flower pot; and
   placing the flower pot into the receiving space of the shape sustaining flower pot cover.

3. The method of claim 1 wherein the lower end of the shape sustaining flower pot cover is further defined as being substantially rigid, and wherein the upper end of the shape sustaining flower pot cover is further defined as being substantially flexible so as to provide the shape sustaining flower pot cover with a billowy appearance.

4. The method of claim 1 wherein the second thickness of the peripheral portion is from about 0.1 mils to about 10 mils and the first thickness of the basal portion is from about 0.2 mils to about 30 mils.

5. The method of claim 1 wherein the step of forming the sheet of material into the shape sustaining flower pot cover is defined further as forming a plurality of overlapping folds in a portion of the shape sustaining flower pot cover with the overlapping folds cooperating to provide the shape sustaining flower pot cover with the mechanical reinforcement needed to maintain the shape sustaining configuration of the shape sustaining flower pot cover.

6. The method of claim 5 wherein the plurality of overlapping folds are further defined as being partially connected.

7. A shape sustaining flower pot cover defining a receiving space for receiving a floral grouping, the shape sustaining flower pot cover comprising:
   a base portion having an upper end, a lower end, a sidewall and a bottom having a first thickness, the sidewall of the base portion having a second thickness less than the first thickness of the bottom of the base portion; and
   a skirt portion positioned about the base portion and extending a distance from the base portion, the skirt portion having a third thickness less than the first thickness of the bottom of the base portion and the second thickness of the sidewall and the shape sustaining flower pot cover being constructed of a material.

8. The shape sustaining flower pot cover of claim 7 wherein the base portion of the shape sustaining flower pot cover is further defined as being constructed of a substantially rigid material, and wherein the skirt portion of the shape sustaining flower pot cover is further defined as being constructed of a substantially flexible material so as to provide the shape sustaining flower pot cover with a billowy appearance.

9. The shape sustaining flower pot cover of claim 7 wherein the second thickness of the peripheral portion of the sheet of material is from about 0.1 mils to about 10 mils and wherein the thickness of the basal portion of the sheet of material is from about 0.3 mils to about 30 mils.

10. The shape sustaining flower pot cover of claim 7 wherein the shape sustaining flower pot cover is further defined as being formed from a sheet of material having an upper surface, a lower surface and an outer peripheral edge, the sheet of material further comprising:
    a basal portion having a periphery and a first thickness; and
    a peripheral portion extending from the periphery of the basal portion to the outer peripheral edge of the sheet of material, the peripheral portion having a second thickness less than the first thickness of the basal portion and wherein the basal portion of the sheet of material forms the bottom of the base portion of the shape sustaining flower pot cover.

11. The shape sustaining flower pot cover of claim 10 wherein the sheet of material is further defined as being constructed out of a plurality of sheets of material which are layered one over another and which are bondingly connected.

12. The shape sustaining flower pot cover of claim 10 wherein the base portion of the shape sustaining flower pot cover further comprises:

a basal portion having a basal rim portion and a basal base portion, the basal base portion being disposed substantially adjacent the bottom of the base portion of the shape sustaining flower pot cover and the basal rim portion of the basal portion extending about an interior surface of the lower end of the base portion of the flower pot cover, the basal portion having a lower end, an upper end, and a height extending generally between the lower and upper end of the basal rim portion, the height of the basal rim being less than one-third a height of the base portion of the shape sustaining flower pot cover.

13. The shape sustaining flower pot cover of claim 10 wherein the base portion and the skirt portion of the shape sustaining flower pot cover are integrally formed and wherein the skirt portion is further defined as being substantially flexible and having:

a first end having a thickness, the first end of the skirt portion being positioned adjacent the base portion of the shape sustaining flower pot cover; and a second end positioned a distance upwardly and outwardly from the first end of the skirt portion, the second end of the skirt portion having a thickness less than the thickness of the first end of the skirt portion so as to provide the shape sustaining flower pot cover with a billowy appearance.

14. The shape sustaining flower pot cover of claim 10 wherein the sidewall of the base portion is further defined as having:

an inner surface; and an outer surface;

and wherein the skirt portion is further defined as being connected to one of the outer and inner surfaces of the base portion such that the skirt portion extends from the upper end of the base portion.

15. The shape sustaining flower pot cover of claim 10 wherein the sidewall of the base portion is further defined as having a second thickness less than the first thickness of the bottom of the base portion.

16. The shape sustaining flower pot cover of claim 10 wherein the sidewall of the base portion is further defined as having:

an inner surface; and an outer surface;

and wherein the skirt portion is further defined as having:

an inner layer connected to the inner surface of the base portion; and an outer layer connected to the outer surface of the base portion wherein the inner layer and the outer layer cooperate such that the skirt portion extends from the upper end of the base portion.

17. The shape sustaining flower pot cover of claim 10 wherein the skirt portion is further defined as being constructed of a plurality of skirt segments contiguously disposed about the upper end of the base portion.

18. The shape sustaining flower pot cover of claim 17 wherein each of the skirt segments forming the skirt portion of the shape sustaining flower pot cover has:

a first side; and a second side;

wherein the skirt segments are disposed about the upper end of the sidewall of the base portion such that the first side of each skirt segment abuttingly engages the second side of the adjacent skirt segment.

19. The shape sustaining flower pot cover of claim 17 wherein each of the skirt segments forming the skirt portion of the shape sustaining flower pot cover has:

a first side; and a second side;

wherein the skirt segments are disposed about the upper end of the sidewall of the base portion such that the first side of each skirt segment overlaps the second side of the adjacent skirt segment.

20. The shape sustaining flower pot cover of claim 17 wherein each of the skirt segments forming the skirt portion of the shape sustaining flower pot cover has:

a first side; and a second side;

wherein the skirt segments of the skirt portion are disposed about the upper end of the sidewall of the base portion such that the first side of each skirt segment is spaced a distance from the second side of the adjacent skirt segment.

21. A shape sustaining flower pot cover, comprising:

a base portion having an upper end, a lower end, a sidewall and a bottom, the sidewall and the bottom cooperating to define a receiving space, the base portion constructed of a thermoplastic material, the sidewall having decorative patterns printed thereon, the base portion being rigid and constructed to receive a growing medium such that the sidewall of the base portion engages at least a portion of the growing medium and retains the growing medium whereby the flower pot cover serves as a flower pot.

22. The shape sustaining flower pot cover of claim 21, wherein the bottom includes a drain hole.

23. The shape sustaining flower pot cover of claim 22, wherein the base portion is constructed from an injection molding process.

24. The shape sustaining flower pot cover of claim 21, wherein the base portion is constructed from a blow molding process.

25. The shape sustaining flower pot cover of claim 21, wherein the base portion is constructed from a thermal forming process.

26. The shape sustaining flower pot cover of claim 21, wherein the base portion is constructed from an injection molding process.

27. The shape sustaining flower pot cover of claim 21, wherein the base portion is constructed from a blow molding process.

28. The shape sustaining flower pot cover of claim 21, wherein the base portion is constructed from a thermal forming process.

29. A method, comprising the steps of:

providing a flower pot cover, the flower pot cover comprising a base portion having an upper end, a lower end, a sidewall and a bottom, the sidewall and the bottom cooperating to define a receiving space, the base portion constructed of a rigid thermoplastic material, the sidewall having decorative patterns printed thereon;

positioning a growing medium into the receiving space of the base portion such that the sidewall of the base portion engages at least a portion of the growing medium and retains the growing medium whereby the flower pot cover serves as a flower pot.

30. The method of claim 29, further comprising the step of utilizing the growing medium to support a floral grouping.

31. The product produced by the method of claim 30.

32. The method of claim 29, wherein in the step of providing the flower pot cover, the bottom of the flower pot cover includes a drain hole.

33. The product produced by the method of claim 32.

34. The product produced by the method of claim 29.

* * * * *